United States Patent [19]
Nishimura et al.

[11] Patent Number: 5,517,971
[45] Date of Patent: May 21, 1996

[54] ENGINE CONTROL EQUIPMENT AND ITS AIR METER

[75] Inventors: Yutaka Nishimura, Katsuta; Atsushi Kanke, Hitachi, both of Japan

[73] Assignee: Hitachi, Ltd., Tokyo, Japan

[21] Appl. No.: 222,636

[22] Filed: Apr. 4, 1994

[30] Foreign Application Priority Data

Apr. 8, 1993 [JP] Japan .................................. 5-81869

[51] Int. Cl.⁶ .............................. F02D 41/18; G01F 1/68; G01P 5/12
[52] U.S. Cl. ................................. 123/494; 73/118.2
[58] Field of Search ................... 123/478, 480, 123/486, 488, 494; 73/118.2

[56] References Cited

U.S. PATENT DOCUMENTS

| | | | |
|---|---|---|---|
| 4,719,891 | 1/1988 | Porth et al. | 123/494 |
| 4,889,101 | 12/1989 | Schifferl | 123/494 |
| 4,926,821 | 5/1990 | Porth et al. | 123/494 |
| 4,945,883 | 8/1990 | Ono et al. | 123/494 |
| 4,991,560 | 2/1991 | Arai et al. | 123/494 |
| 5,107,812 | 4/1992 | Takamoto et al. | 123/494 |

FOREIGN PATENT DOCUMENTS 64-73150  3/1989  Japan .

*Primary Examiner*—Willis R. Wolfe
*Attorney, Agent, or Firm*—Evenson, McKeown, Edwards & Lenahan

[57] ABSTRACT

The air meter forming part of the air intake passage of the engine is equipped with an electronic circuit for measuring the rate of intake air and a memory for storing data pertaining to actual air flow rate versus output characteristics of the air meter or correction data for calculation of air flow rate. The engine control unit digitally calculates actual air flow rate to be used for determination of the amount of fuel to be supplied from a signal output from the air meter with reference to the air flow rate versus output characteristics of the air meter or air flow correction data fetched from the memory provided on the air meter body.

22 Claims, 24 Drawing Sheets

ENGINE CONTROL EQUIPMENT AND ITS AIR METER

BACKGROUND OF THE INVENTION

1. Field of the Invention

The present invention relates to an engine control equipment of the electronic control type and an air meter for the engine control equipment.

2. Description of the Prior Art

In an electronic engine control equipment for automobiles, the rate of fuel supplied to the engine (or the duration of a fuel injection pulse) is calculated by an engine control unit (microcomputer) having a function of inputting a signal indicating the rate of air flowing through an intake passage measured by the air meter, a signal representing the rate of revolutions of the engine, a coolant temperature signal, etc. and performing a digital operation on these signals. There have been various types of air meters for this type of engine control system. One of the most widely-used air meters uses a principle of a thermal air flow meter such as exothermic resistance elements whose resistance is dependent upon temperature as they are very small and can directly measure the mass and flow rate of air.

A conventional engine control equipment stores the standard air flow rate versus output characteristics table in advance in the engine control unit which works as the core of the engine control equipment and calculates the rate of intake air from a signal output from the air meter with reference to said table.

To calculate the rate of intake air using said table, a means is required which matches the actual air flow rate versus output characteristics of the air meter with a preset standard air flow rate versus output characteristics table (hereinafter mentioned as standard characteristics table) since each air meter product has specific output versus flow rate characteristics. It is well known that a typical one of such means consists of flowing air of a preset rate through two known different points and adjusting the amplification factor and the differential voltage of the differential amplifier provided on the output side of the air meter so that the outputs at these two points of the air meter may have the expected values (two points in the standard characteristics).

However, as the air flow versus output relation is not linear, it is technically hard to adjust said relation correctly. When you adjust the amplification factor and the differential voltage at one point to match two output signals with the expected values, the values on the other point may go off the expected values. To make this deviation smaller, you must repeat the above steps. Therefore, this adjustment is very time-consuming. Accordingly, presentation of a drastic adjusting method is expected.

When considered with the above description, a new art has been presented which calculates the rate of intake air from the corresponding sensor output in actual operation using the air flow rate versus output characteristics of the air flow sensor which is measured and stored in advance in a storage element built in the engine control unit. For example, such an art is described in Japanese Patent Application Laid-Open No. 64-73150.

Although the above latter art has a merit of omitting a step of matching the output characteristics of the air meter with the preset standard characteristics, said art becomes not applicable when the air meter is replaced by a new one.

SUMMARY OF THE INVENTION

An object of the present invention is to provide an engine control unit having an air meter which does not require any troublesome adjustment to match the output of the air meter to the preset standard characteristics as in the conventional art when an air meter is connected to the engine control unit and is applicable even when the air meter is replaced by a new one. (First problem)

Another object of the present invention is to enable any air meter manufacturer and automobile parts manufacturer to prepare a means to attain said main object. (Second problem)

These and other objects of the present invention are to prevent an air meter from being assembled improperly on the engine control unit (Third problem) and to provide a means of keeping a relation between physical sensor quantities such as an air thermometer, a throttle opening meter, etc. and output signals right and stable in said air meter. (Fourth problem)

The present invention basically provides the following means to solve the above problems:

To solve the first problem, an engine control equipment in accordance with the present invention which comprises an air meter for measuring the rate of air taken into an engine and an engine control unit for calculating the rate of fuel to be supplied to the engine according to this rate of intake air is further provided with a storage means on the side of said air meter separately from said engine control unit wherein said storage means stores air flow rate versus output characteristics data of the air meter itself and the characteristics data is sent to an air flow rate computing means (hereinafter referred to as a problem solving means 1-1).

The present invention offers the following as an air meter for this engine control equipment: An air meter having an electronic circuit for measuring an air flow rate and a storage means on the body of the air meter forming part of the intake passage of the engine wherein said storage means stores air flow rate versus output characteristics data for calculation of air flow rate which was obtained by supplying air of a preset rate to said air meter body (hereinafter referred to as a problem solving means 1-2).

In the engine control equipment as said problem solving means 1-1, the storage means provided on the side of the air meter as mentioned in the problem solving means 1-1 can store correction data to be used for calculation of air flow rates (hereinafter referred to as a problem solving means 1-3).

As a related air meter, the present invention offers an air meter having an electronic circuit for measuring an air flow rate and a storage means on the body of the air meter forming part of the intake passage of the engine wherein said storage means stores correction data to be used for calculation of air flow rates (hereinafter referred to as a problem solving means 1-4).

As a second problem solving means, the present invention offers an air meter having an electronic circuit for measuring an air flow rate and a storage means on the body of the air meter forming part of the intake passage of the engine wherein said storage means is electrically connectable to the engine control unit outside the air meter body.

As a third problem solving means, the following are added to the components of said problem solving means 1-1 or 1-3: The storage means provided on the side of the air meter stores data to identify the type of said air meter and said engine control unit has a means to judge whether the air meter is available according to this type identifying data.

As a fourth problem solving means, the air meter to be used as said problem solving means has a sensor (e.g, air thermometer or a throttle opening sensor) which detects a status required for engine control other than air flow rates and a storage means provided on said air meter stores data pertaining to output characteristics of the sensor (for example, data pertaining to temperature versus output characteristics when said sensor is an air thermometer or data pertaining to throttle opening versus output characteristics when said sensor is a throttle opening sensor).

Operation of the problem solving means 1-1: The air flow rate can be calculated at high accuracy in a wide range of air flow rate by storing air flow rate versus output characteristics data of the air meter itself in the storage means provided on the side of the air meter separately from the engine control unit and calculating signals output from the air meter by using this air flow rate versus output characteristics data. In this case, even when the air meter has different output characteristics, a matching work (comprising flowing air of a preset rate through two known different points and adjusting the amplification factor and the differential voltage of the differential amplifier provided on the output side of the air meter so that the outputs at these two points of the air meter may match those of two points of the standard characteristics) can be omitted as actual air flow rate versus output characteristics data of the air meter product is used while the matching work is conventionally required when the engine control unit has standard air flow rate versus output characteristics data (standard characteristics data).

Further, as this invention is made to offer the air flow rate versus output characteristics data of the air meter itself from the air meter, the air meter can be connected to any engine control unit of the same type and available without matching. Thereby, an engine control equipment having a wide replacement and compatibility range of air meters is attained.

In this case, air flow rates are calculated by a microcomputer (CPU) built in the engine control unit or by an additional CPU provided on the air meter.

Operation of the problem solving means 1-2: The operation of said problem solving means 1-1 can be obtained by providing a storage means storing actual air flow rate versus output characteristics data of the air meter itself (data pertaining to the air flow rate versus output characteristics obtained by supplying air of a preset rate to the air meter body) instead of the standard characteristics on the air meter body and by connecting this storage means to the flow rate calculating micro computer.

Operation of the problem solving means 1-3: This problem solving means intends to eliminate a conventional complicated matching work which adjusts the amplification factor and the differential voltage of the differential amplifier provided on the output side of the air meter even when the rate of air flow is determined by processing a signal output from the air meter with reference to standard air flow rate versus output characteristics data (standard characteristics data).

In other words, if a storage means provided on the air meter stores correction data (correction constants such as correction coefficients) for calculation of flow rates specific to air meters in advance, a correction operation of matching the characteristics of signals output from the air meter with the standard characteristics can be carried out using this correction data. Further, when this corrected output signal is processed using the standard characteristic data, actual flow rates can be obtained at high accuracy in a wide range.

Accordingly, this problem solving means capable of matching the characteristics of output signals of the air meter with the standard characteristics by using correction data can eliminate a conventional complicated hardware matching work (adjusting the differential amplifier on the output side of the air meter). Instead of the hardware matching, this problem solving means can perform software matching automatically. Therefore, this problem solving means can provide an engine control equipment having a wide replacement and compatibility range of air meters.

Operation of the second problem solving means: In accordance with this problem solving means, a storage means is provided on the body of an air meter and said storage means is electrically connectable to the engine control unit separately from the air meter. When said air flow rate versus output characteristics data or correction data is stored in advance in said storage means, the engine control unit fetches this data, processes signals output from the air meter, and thereby determines the rate of intake air. Furthermore, it is possible to have this air flow rate versus output characteristics data and correction data written in the storage means by the air meter manufacturers before the storage means are mounted on engines or in the storage means by the automobile manufacturers after the storage means are mounted on engines. Therefore, data can be created and written freely by the manufacturers'.

Operation of the third problem solving means: When said storage means provided on the air meter contains data to identify air meter types, the engine control equipment can check whether or not an air meter connected to the engine control unit in part assembling or replacement is adequate and available. Accordingly, connections of wrong types of air meters to engine control units can be avoided.

Operation of the fourth problem solving means: In accordance with this problem solving means, characteristics data of sensors required for engine control are also fetched from the storage means provided on said air meter and used to obtain actual sensor values. Particularly, in the case of an air thermometer and a throttle opening sensor which are sometimes provided on the intake passage body of the air meter, if their characteristics data is supplied from the air meter, an excellent compatibility of air meters can be given to the engine control unit as well as the air meter in the problem solving means 1-1 and 1-3.

DETAILED DESCRIPTION OF THE PREFERRED EMBODIMENTS

The preferred embodiments of the present invention will be explained below together with the accompanying drawings.

Figure 1:
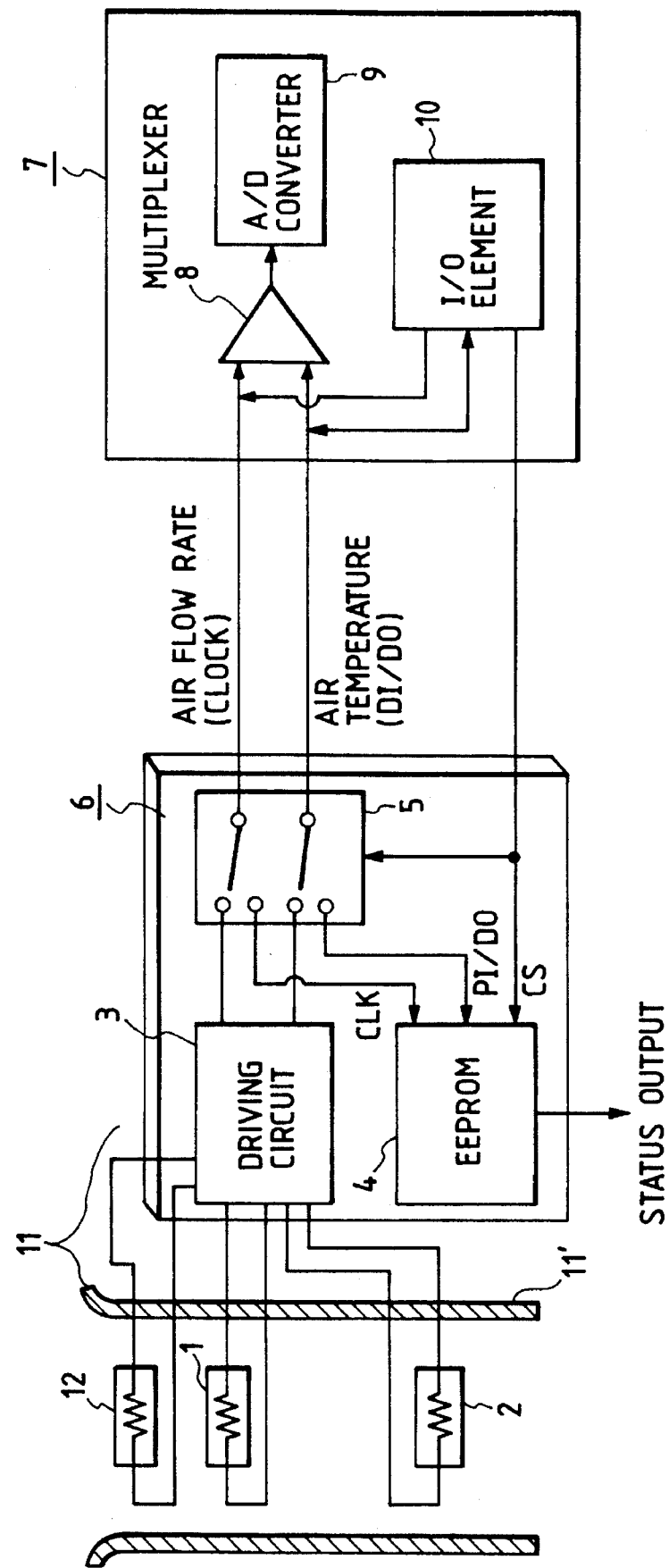
FIG. 1 shows an engine control system configuration of a first embodiment of the present invention.

FIG. 1 is a block diagram of an engine control equipment illustrating a first embodiment of the present invention.

In FIG. 1, an air meter 11 for measuring the rate of air taken into an engine comprises an air meter body 11' forming a part of the intake passage of the engine, an electronic circuit 6 for measuring the rate of intake air which contains air flow rate measuring elements 1, and 2, and a storage means 4.

An exothermic resistance element 1, a temperature-compensating element 2, and an air temperature detecting element 12 which are the air flow rate measuring elements are disposed in the internal passage of the air meter body 11'. These elements 1, 2, and 12 are all thermosensitive resistance elements whose resistances are dependent upon temperatures. They can be platinum coils formed on bobbins, thin film resistors, semiconductor elements, etc.

On the side wall of the air meter body 11' is provided a printed circuit board 6 (hereinafter simply called an electronic circuit) constituting an electronic circuit (for measuring the rate of intake air) for any other air meter than said measuring elements 1, 2, and 12. This electronic circuit 6 includes a storage means 4. The content of data stored in this storage means 4 will be explained in detail later.

The electronic circuit 6 for measuring the rate of intake air has an air meter driving circuit 3 and an analog switch 5. The driving circuit 3 drives the air flow rate measuring element 1, the temperature-compensating element 2, and an air temperature detecting element 12, amplifies detection signals from these elements, and outputs the amplified signals to the engine control unit 7 provided separately from the air meter 11 via the analog switch 5.

The storage means 4 provided on the air meter 11 stores various data such as data pertaining to the air flow rate versus output characteristics of the air meter itself, data pertaining to the air temperature versus output characteristics of the air meter, etc. The air flow rate versus output characteristics data are determined by flowing air of preset rates through the air meter body 11' and measuring the outputs of the sensors. Similarly, the air temperature versus output characteristics are determined by flowing air of preset temperatures and measuring the outputs of the sensors.

The storage means 4 can employ serial EEPROM, EPROM, or RAM and its contents can be fetched by an instruction sent from the engine control unit 7 to which the storage means is connected.

This embodiment employs a serial EEPROM as the storage means 4. The serial EEPROM 4 is connected to the engine control unit 7 by means of the Chip Select (CS) signal input line. Its Data In/Data Output (DI/DO) line is connected to the engine control unit 7 by switching by the analog switch 5.

The analog switch 5 has a function to switch the connection of the engine control unit 7 to the air meter driving circuit 3 or to the EEPROM 4. Substantially, when the Chip Select signal (CS) sent from an I/O element 10 in the engine control unit 7 becomes high, the Chip Select signal (CS) causes the analog switch 5 to connect the I/O element to the clock input terminal (CLK) and the DI/DO terminal of the EEPROM 4. When the Chip Select signal (CS) is low, the analog switch 5 connects the outputs of the air meter driving circuit 3 to the input pins of the multiplexer 8 of the engine control unit 7.

The Flow Rate signal and the Air Temperature signal detected by the air meter 11 are input to the multiplexer 8, then to the A/D converter 9 in the engine control unit 7 through the analog switch 5 and used for determination of the quantity of fuel to be injected and ignition timing.

Figure 2:
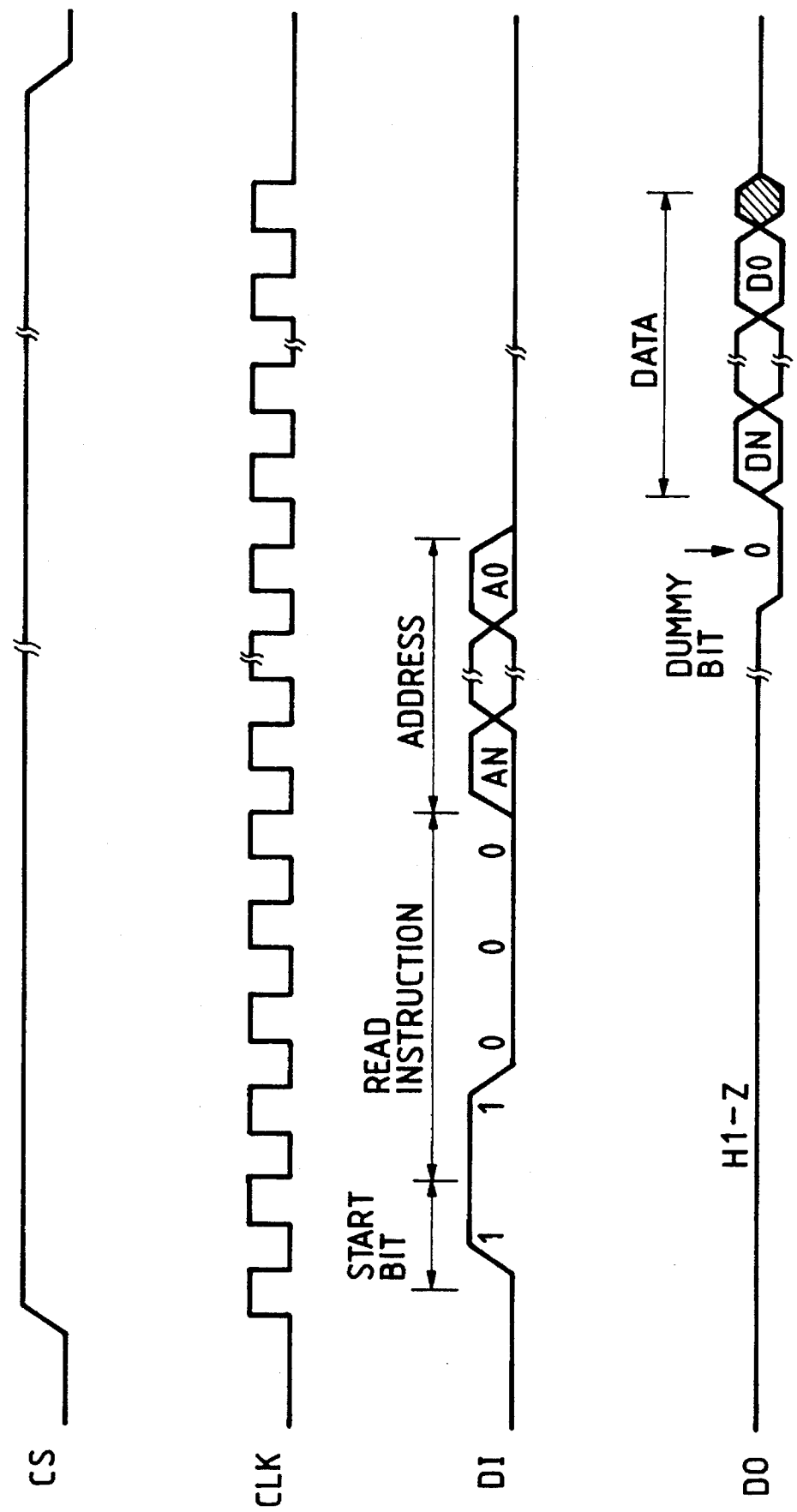
FIG. 2 shows a timing diagram of fetching data from the serial EEPROM used in the first embodiment.

FIG. 2 is a timing diagram illustrating the timing for fetching the content of the serial EEPROM 4 and transferring it to the engine control unit 7. This fetching is carried out when the engine key switch is turned on or off. In the other timing, the output terminals of the air meter driving circuit 3 are connected to the engine control unit 7.

As shown in FIG. 2, in the timing for fetching the content of EEPROM 4, Chip Select (CS), Clock (CLK), and Data Input (DI) signals are sent from the I/O element 10 in the engine control unit 7 serially to the EEPROM 4. In this case, the Chip Select signal becomes high. This signal is also applied to the input of the analog switch 5 so as to connect the EEPROM 4 to the I/O element 10.

A start bit, a fetch instruction, and an address are input as a Data Input signal (DI) to the EEPROM 4. In response to this signal, the electronic circuit causes the EEPROM 4 to output data as the Data Output (DO) signal from the specified address to the engine control unit 7. The data is stored in RAM 15 (illustrated in FIG. 3) via the I/O element 10 in the engine control unit 7.

In FIG. 1, the Data Input line (DI) and the Data Output line (DO) are identical. The Status Output terminal of the EEPROM 4 is used to store data in the EEPROM 4. The address and data are stored in the EEPROM 4 at good timing according to the status output.

Figure 3:
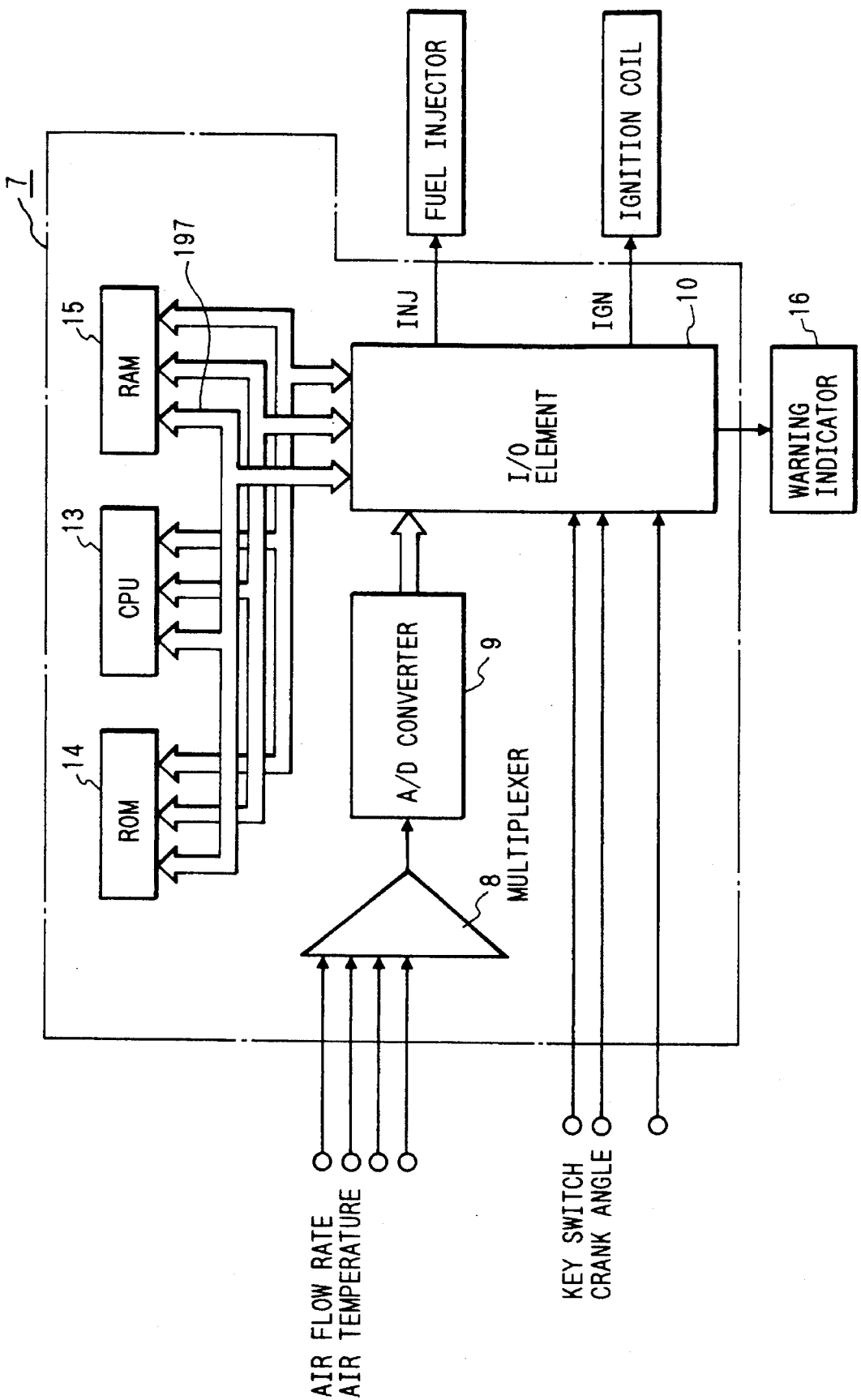
FIG. 3 shows a detailed block diagram of the engine control unit used in the first embodiment.

FIG. 3 is a detailed block diagram illustrating the engine control unit 7. The analog signals such as an Air Flow Rate signal and an Air Temperature signal are input to the multiplexer 8, selected in a time-division manner, sent to the A/D converter 9, and converted into digital signals. Similarly, pulse signals such as Crank Angle, Key Switch, and EEPROM 4 output are also input through the I/O element 10. The CPU 13 performs digital operations required for engine control. ROM 14 is a storage means for storing engine control programs and data. RAM 15 is a readable and writable storage element. The I/O element 10 has a function of sending input signals to the CPU 13 and sending various instruction signals from the CPU 13 to fuel injectors, ignition coils, and the electronic circuit 6 (EEPROM 4 and analog switch 5) provided on the air meter 11.

Figure 4:
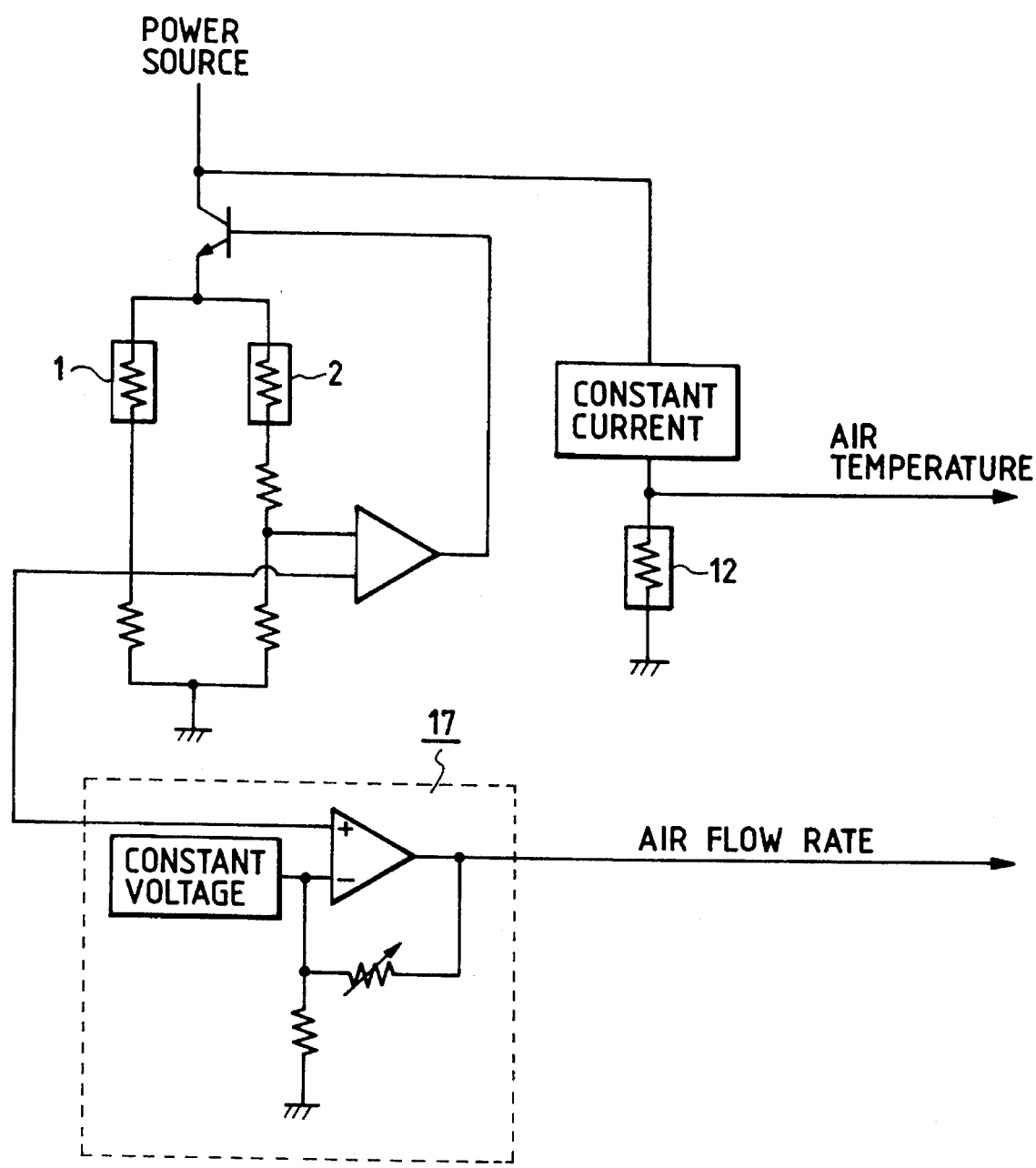
FIG. 4 shows a detailed block diagram of the air meter driving circuit used in the first embodiment.

FIG. 4 is a detailed block diagram illustrating the driving circuit 3 of the air meter 11. The output of the thermosensitive air meter 11 made of a wheatstone bridge having a exothermic resistance element 1 and a temperature compensating element 2 as its two arms is amplified by a differential amplifier 17 and output as an Air Flow Rate signal to the engine control unit. A constant current is supplied to the air temperature detecting element 12. The potential at the top of the air temperature detecting element 12 is output as an Air Temperature signal.

The following section explains the timing of fetching the content of the EEPROM 4 provided on the air meter 11 and transferring it to the engine control unit 7.

Figure 5:
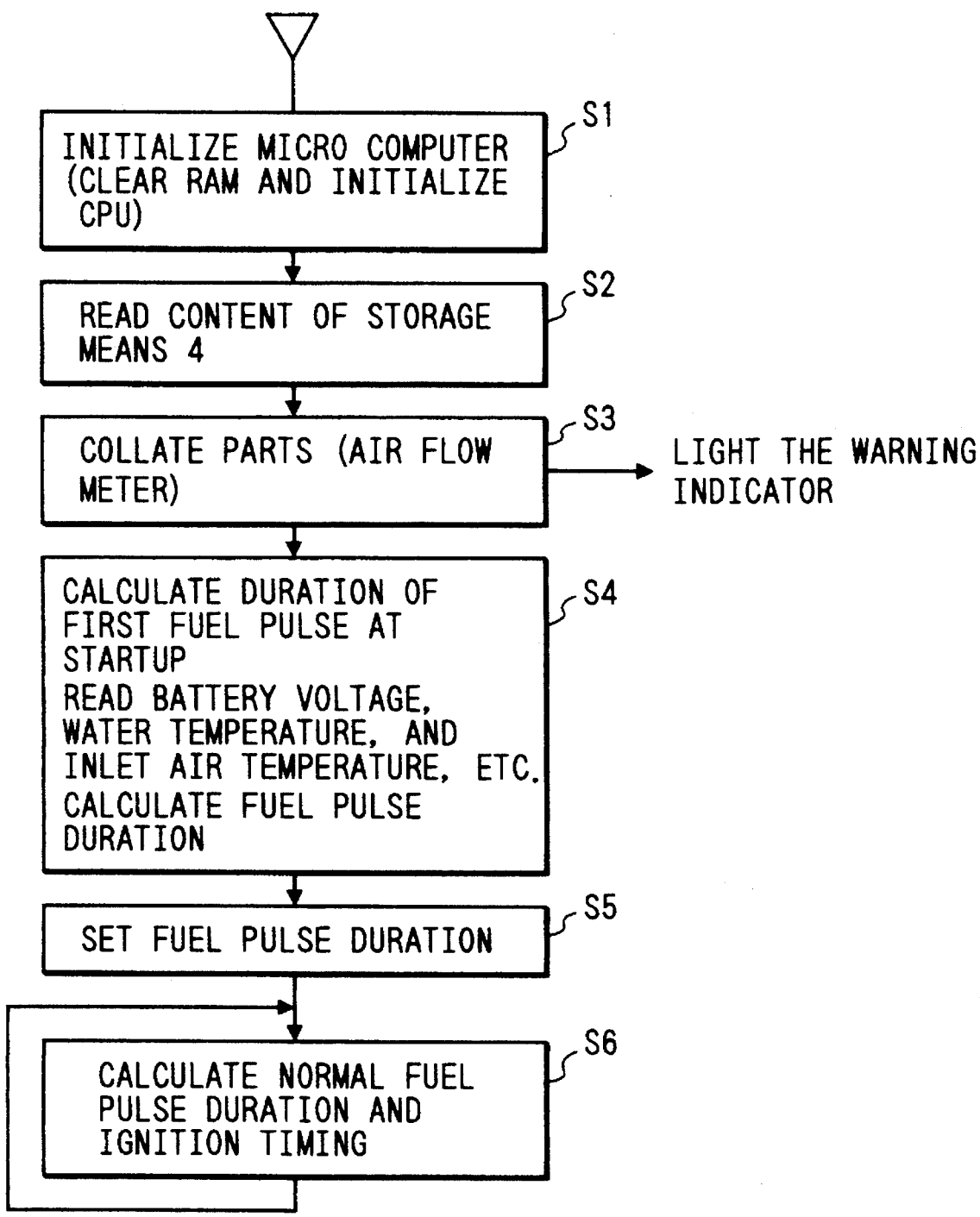
FIG. 5 shows a flow chart of operation of the first embodiment.

FIG. 5 is a flow chart illustrating the operation to fetch the content of the EEPROM 4 when the key switch of the engine is turned on. When the key switch is turned on, the RAM 15 in the engine control unit 7 is cleared and the CPU 13 is initialized (Step S1). The content of the EEPROM 4 is fetched (Step S2). The engine control unit 7 sends a Chip Select signal, Clock, a fetch instruction, and an address to the EEPROM 4 to store data in RAM 15. The content of the EEPROM 4 is as follows:

(1) Air flow rate versus output characteristics data of the air meter
(2) Air temperature versus output characteristics data of the air meter
(3) Throttle opening versus output characteristics data of the throttle opening meter
(4) Air meter type identification number
(5) Response time constant of the air meter In step S3, the air meter type identification number fetched from the EEPROM 4 is collated by preset type identification numbers stored in the engine control unit 7. If they do not match with each other, the warning indicator illustrated in FIG. 3 lights indicating that the air meter is of a wrong type. This is provided to prevent installation of a wrong type of air meter. Steps S4, S5, and S6 are well-known timing control steps for controlling the engine startup timing, the fuel injection rate, and the ignition timing. In accordance with this fetching method, the content of the EEPROM 4 is fetched after the key switch is turned and before the engine starts. Accordingly, the content of the EEPROM 4 can be fetched correctly without being interferred by ignition noises as the engine is not in operation.

Figure 6:
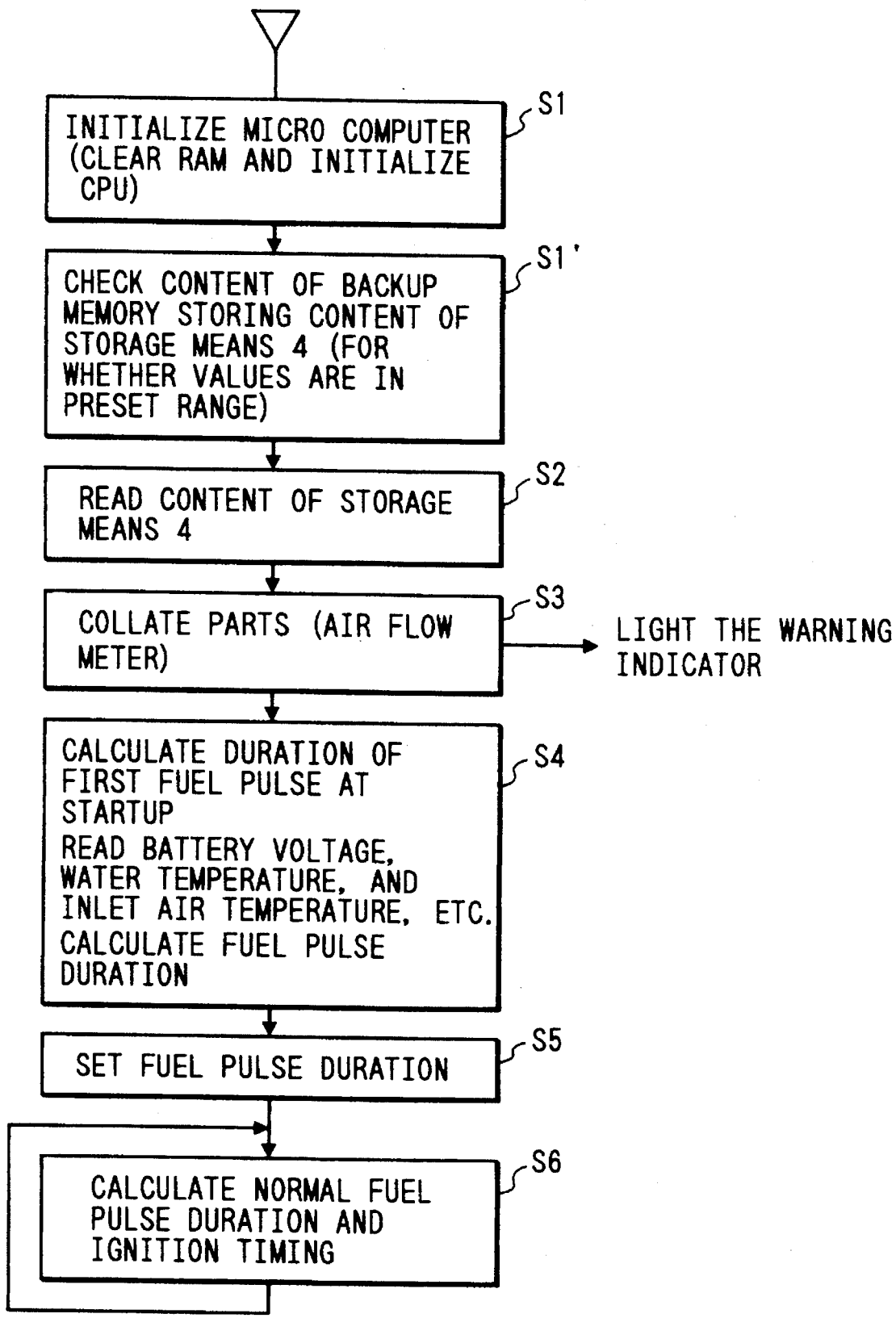
FIG. 6 shows a flow chart of variation operation of the first embodiment.

FIG. 6 is a variation of FIG. 5. An identical step number in FIG. 5 and FIG. 6 represents the same function. This example assumes that RAM 15 provided in the engine control unit 7 has a function of retaining data fetched from the EEPROM 4 with a backup power supply.

In step S1', the microcomputer fetches the content of an address of the backup RAM 15 of the engine control unit 7 which stores the content of the EEPROM 4 and checks whether its value (data value) is in a preset value range. If it is not in the preset value range, the micro computer assumes that a backup power supply was shut off temporarily (e.g. when the power terminals are disconnected for replacement of the battery, etc.) and that the content of RAM 15 has been cleared, fetches the content of the EEPROM 4 again in step S2, then goes to the next step. When the data value is in the preset value range, the micro computer goes to step S4 without fetching the content of the EEPROM 4.

In accordance with this method, whether or not the content of the EEPROM 4 is already fetched and retained in the backup RAM 15 in the engine control unit 7 can be checked. Once fetching in step S2 which takes 0.1 to 0.2 second is carried out, no more fetching is required. Consequentially, the time before the start of the engine can be reduced and the number of fetchings is also reduced. This procedure has a merit of possibility of fetching the content of the EEPROM 4.

Figure 7:
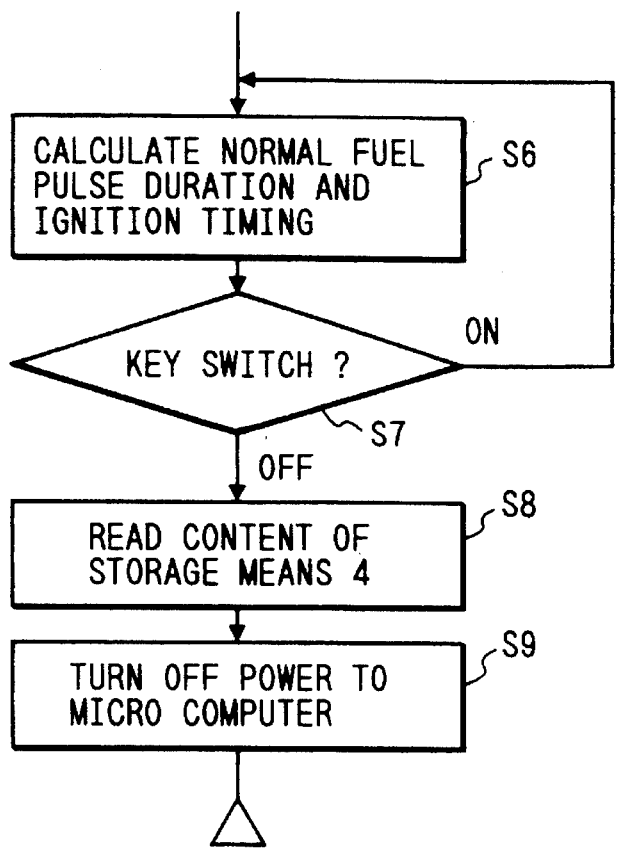
FIG. 7 shows a flow chart of variation operation of the first embodiment.

FIG. 7 is another variation of FIG. 5, illustrating another method of fetching the content of the EEPROM 4. This method fetches the content of the EEPROM 4 and stores it in the backup RAM 15 when the key switch of the switch is turned off.

This example checks whether the key switch is turned on or off in step S7, fetches the content of the EEPROM 4, stores it in the backup RAM 15 in the engine control unit 7, and turns off power to the micro computer of the engine control unit 7 in step S9. Also in this case, the fetching from the EEPROM 4 is carried out after the key switch is turned off. Accordingly, this method has a merit of fetching EEPROM 4 data correctly without ignition noises. As well as in FIG. 6, it is possible to skip step S8 after checking that the content of the EEPROM 4 is already stored in the backup RAM 15 in the engine control unit 7.

Next, a method of determining the rate of intake air from a signal sent from the air meter 11 by using the air flow rate versus output characteristics data which is transferred from the EEPROM 4 to the engine control unit 7 is explained below together with FIG. 8 and FIG. 9.

Figure 8:
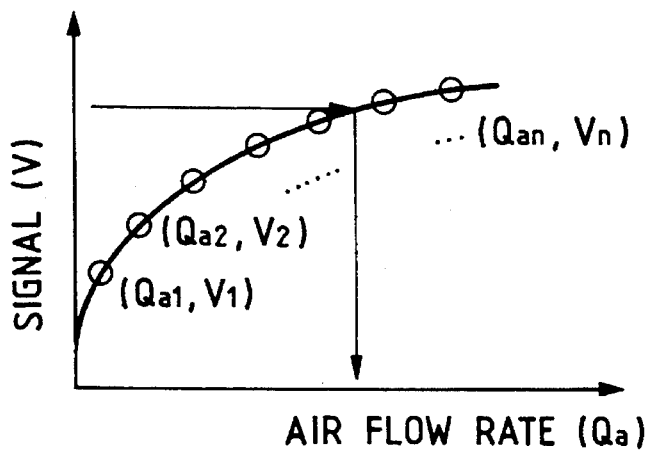
FIG. 8 shows an explanatory graph illustrating air flow rate versus output characteristics data used in the first embodiment.

FIG. 8 is a graphic representation illustrating the air flow rate versus output characteristics data which is stored in the storage means 4. The air flow rate versus output characteristics data is determined by actually flowing air at ten or more preset flow rates through the air meter, measuring output signals V of sensors, and plotting the relation between the flow rates Qa and the output signals V. In step S2 in FIG. 5 and FIG. 6 or in step S8 in FIG. 7, this characteristics data is fetched from the storage means 4 on the air meter 11 and stored in the engine control unit 7. This data is created into an air flow rate versus output characteristics shown in FIG. 8 table and stored in the RAM 15.

Figure 9:
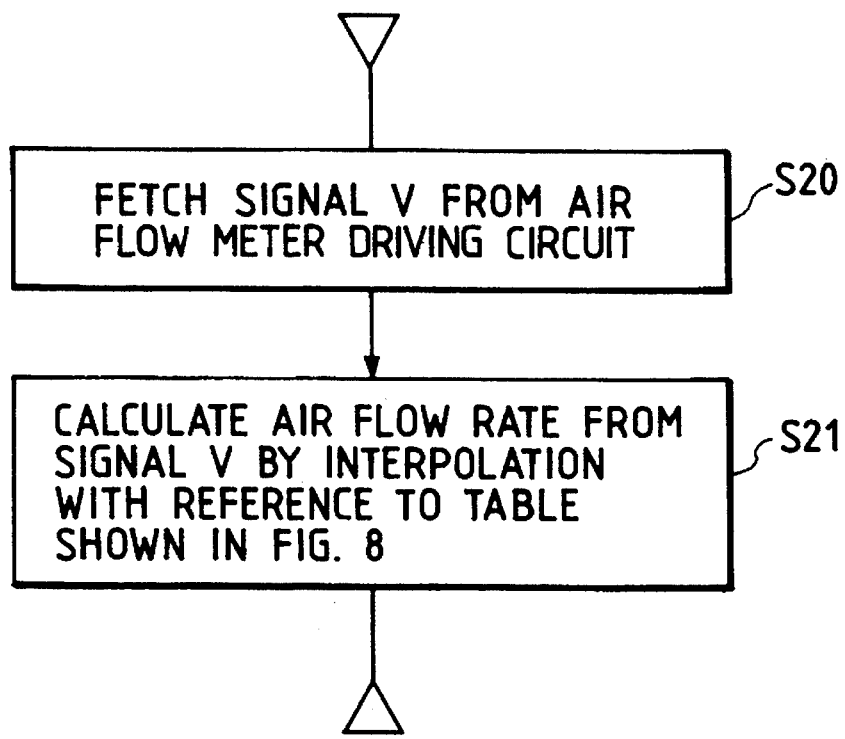
FIG. 9 shows a flow chart of calculating the rate of air flow in the first embodiment.

In the normal fuel control programming steps illustrated in FIG. 9, the step S20 transfers output signals V in actual operation from the air meter driving circuit 3 to the engine control unit 7 via the multiplexer 8 and the A/D converter 9. The step S21 determines the rate of intake air Qa from signal V by interpolation using the table shown in FIG. 8.

In accordance with this embodiment, actual air flow rate versus output characteristics data of the air meter itself is used for calculation of air flow rates. This embodiment does not require conventional standard characteristics data and repetitive adjustment by matching the output of the differential amplifier to the standard characteristics. Thereby, this embodiment can obtain flow rates at high accuracy in a wide range and reduce the time for adjustment. Further, this embodiment can offer the air flow rate versus output characteristics data required for calculation of air flow rates from the air meter 11 to the engine control unit 7. This enables connection of air meters 11 to any engine control units 7 of the same type without a conventional complicated matching operation. In other words, this makes the engine control unit 7 more air-meter-compatible.

Another preferred embodiment (a second embodiment) of the present invention will be explained below together with the accompanying drawings FIGS. 10–12.

This embodiment assumes the use of the standard air flow rate versus output characteristics data (standard characteristics data) instead of actual air flow rate versus output characteristics data of the air meter itself shown in FIG. 8. This embodiment respectively corrects the outputs of the air meter so that they may match the standard characteristics, applies the standard characteristics data to the corrected output values, and thereby determines the flow rate. The standard characteristics data is retained in the ROM 14 in the engine control unit 7 and transferred to the RAM 15. The storage means 4 provided in the air meter 11 retains correction data to be used to match the actual outputs of the air meter to the standard characteristics.

A method of creating correction data to be stored in the storage means 4 is explained below together with FIG. 10. In creation of correction data, this example flows air of preset flow rates $Qa_1$, $Qa_2$, $Qa_3$, and $Qa_4$ through the air meter 11, measures the corresponding signal outputs $V_1$, $V_2$, $V_3$, and $V_4$, calculates gain values (correction coefficients) $C_1$, $C_3$, and $C_5$ and bias values (constants) $C_2$, $C_4$, and $C_6$ to match the measured values with the standard characteristic values as shown in FIG. 10, and stores these gain values $C_1$, $C_3$, and $C_5$, bias values $C_2$, $C_4$, and $C_6$, and measured values $V_1$, $V_2$, $V_3$, and $V_4$ in the storage means 4 as shown in FIG. 11. The correction data stored in the storage means 4 is fetched from storage means and sent to the engine control unit 7 in step S2 in FIG. 5 and FIG. 6 or in step S8 in FIG. 7, transferred to RAM 15, and used for calculation of flow rates in the fuel control programming steps shown in FIG. 12.

Figure 12:
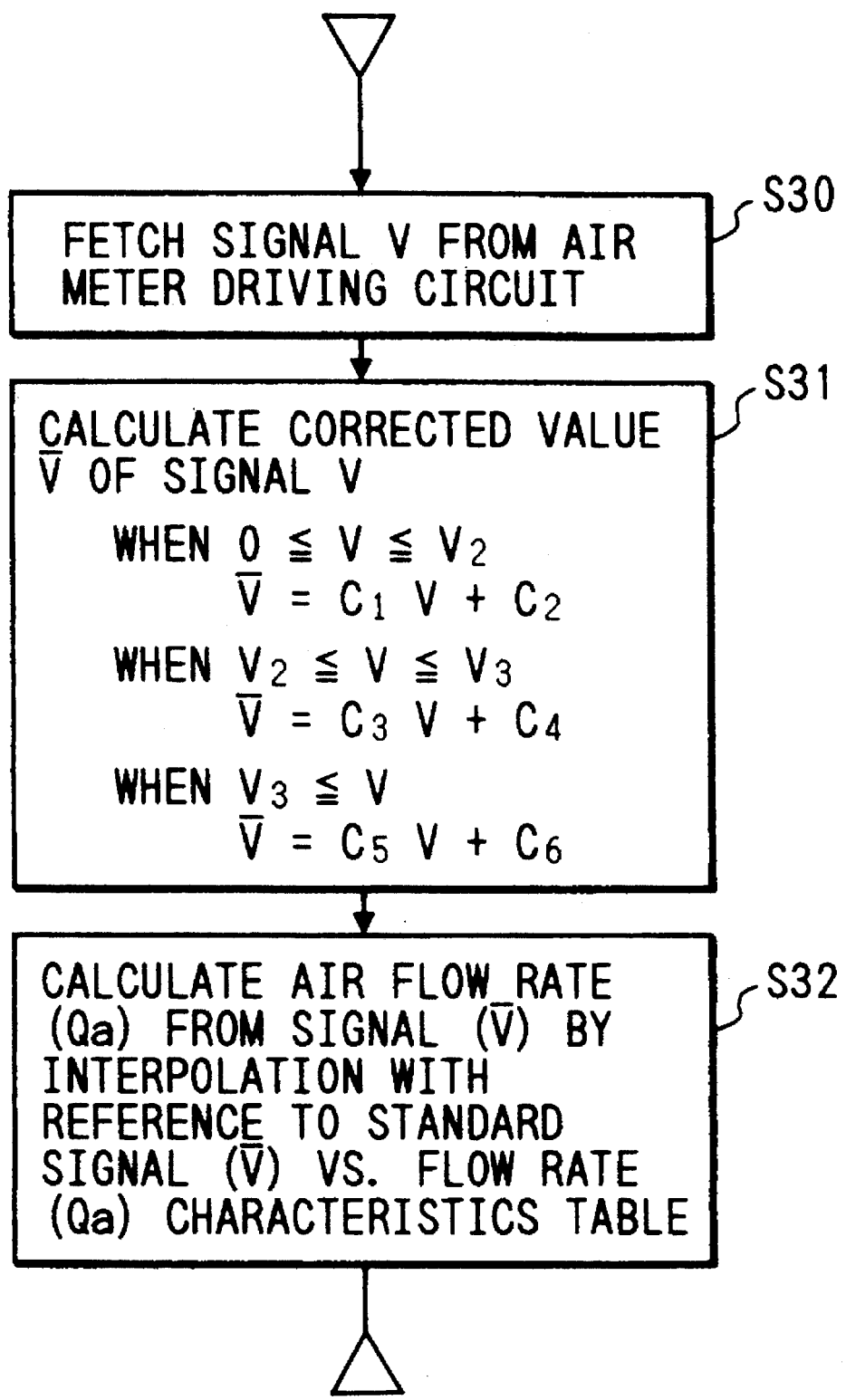
FIG. 12 shows a flow chart explaining a method of determining an air flow rate in the second embodiment.

In other words, as shown in FIG. 12, signals V are fetched from the air meter driving circuit 3 in actual operation in step S30. These signals V are corrected according to the selected gain values $C_1$, $C_3$, and $C_5$ and bias values $C_2$, $C_4$, and $C_6$ to match the standard characteristics values in step S31.

In step S32, the corrected signal values are interpolated using a table representing the relation between the signal corrected values and flow rates (standard characteristics data) stored in the engine control unit 7. Thereby actual flow rates are obtained.

This method corrects output signals of the air meter. Consequentially, however, air flow rates can be obtained at high accuracy in a wide range as this method like the method illustrated in FIGS. 8 and 9 uses the flow-rate versus signal-output relation obtained by measurement of each air meter. Further, this method does not require any conventional repetitive adjustment on the differential amplifier, but enables automatic and logical adjustment of the air meter by using correction data. Furthermore, this method can make the engine control unit highly air-meter-compatible as this method can offer correction data required for calculation of air flow rates from the side of the air meter and enables connection of air flow meters to engine control units of the same type. Furthermore, this method can have less data to be stored in the storage means 4 in comparison with the case of FIGS. 8 and 9. An example illustrated in FIG. 11 employs four flow rates for creation of standard characteristics data, but they can be two, three, or more than four flow rates.

Figure 10:
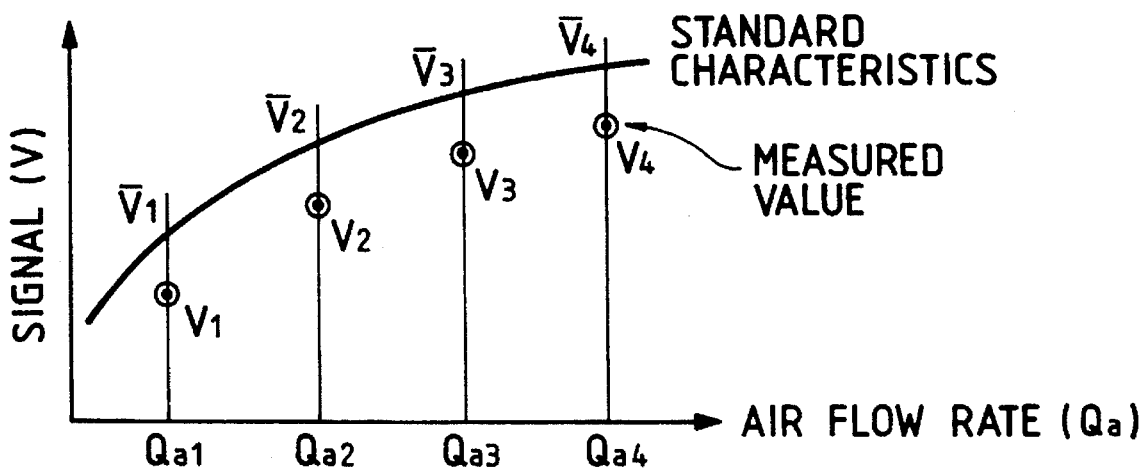
FIG. 10 shows a graph explaining a method of determining flow rate correction constants in a second embodiment of the present invention.

It is possible to store concrete values $V_1, V_2, V_3, \ldots, Vn$ to be assigned to expressions of calculating said correction constants and corresponding air flow rates $Qa_1$, $Qa_2$, and $Qa_3$ in the storage means 4 instead of correction constants (gain and bias values) and to store expressions for calculating correction constants in the ROM 14 in the engine control unit 7 as shown in FIG. 10 so that the CPU 13 may obtain correction constants.

Figure 13:
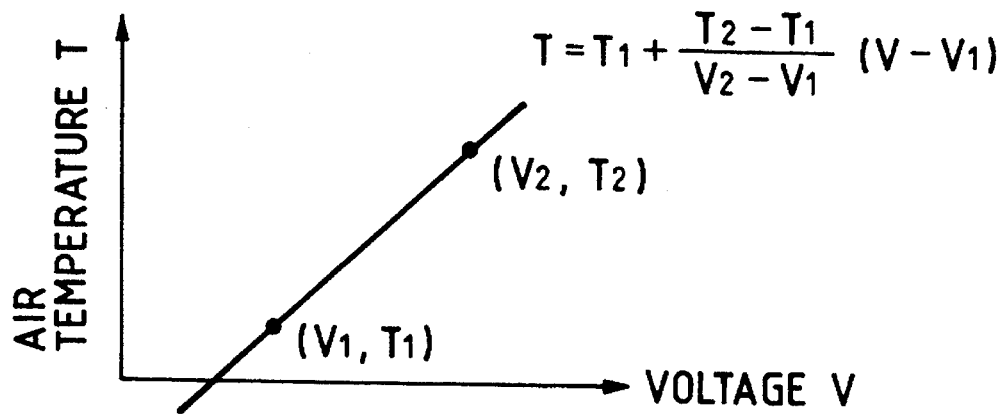
FIG. 13 shows a graph illustrating output versus air temperature characteristics data of the air thermometer used in the first and second embodiments.
Figure 14:
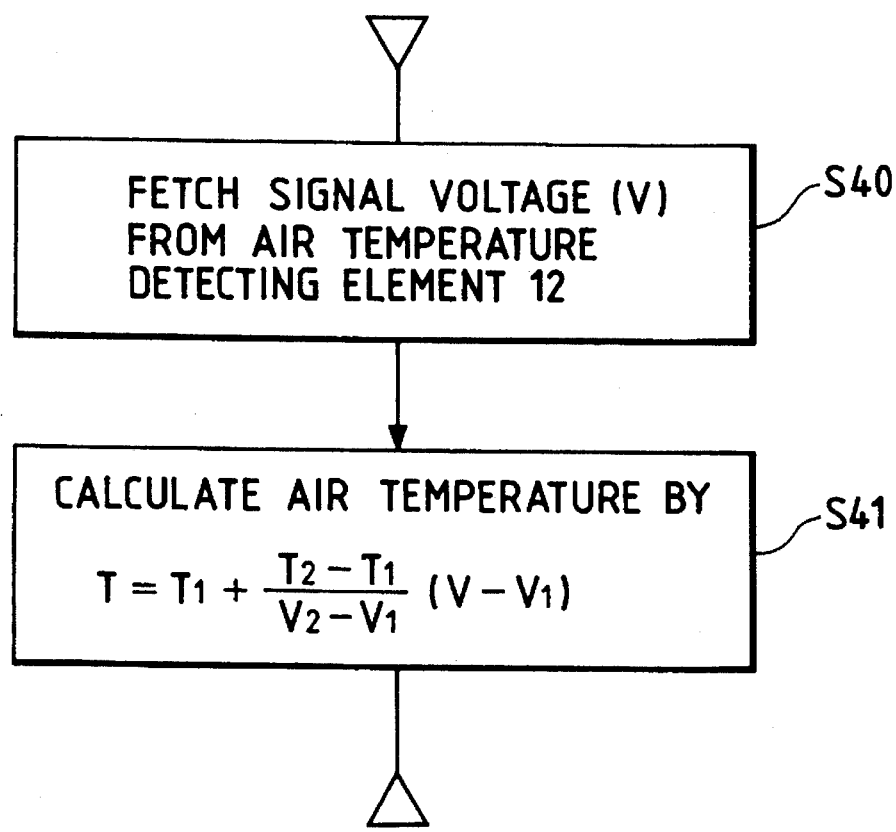
FIG. 14 shows a flow chart explaining a method of determining said air temperature.

FIG. 13 and FIG. 14 are graphic and schematic representations explaining air temperatures from a signal sent from an air temperature detecting element 12. The air temperature values implicitly indicating the density of intake air are used for correction of the rate of fuel to be injected. Two sets of actually measured air temperatures and sensor signals ($T_1$, $V_1$) and ($T_2$, $V_2$) are fetched from the storage element 4 and stored in the engine control unit 7 in step S2 in FIG. 5 and FIG. 6 or in step S8 in FIG. 7. Step S40 in FIG. 14 fetches the voltage of a signal sent from the air temperature detecting element 12 in normal operation. The relation between the air temperature T and the signal voltage V is expressed by a simple equation shown in FIG. 13. Step 41 assigns the signal voltage V to said equation and obtains the temperature of intake air. Accordingly, this method has an effect to eliminate an adjusting step to narrow the dispersion of the resistance value and resistor temperature coefficient of the air temperature detecting element 12 shown in FIG. 4.

Figure 15:
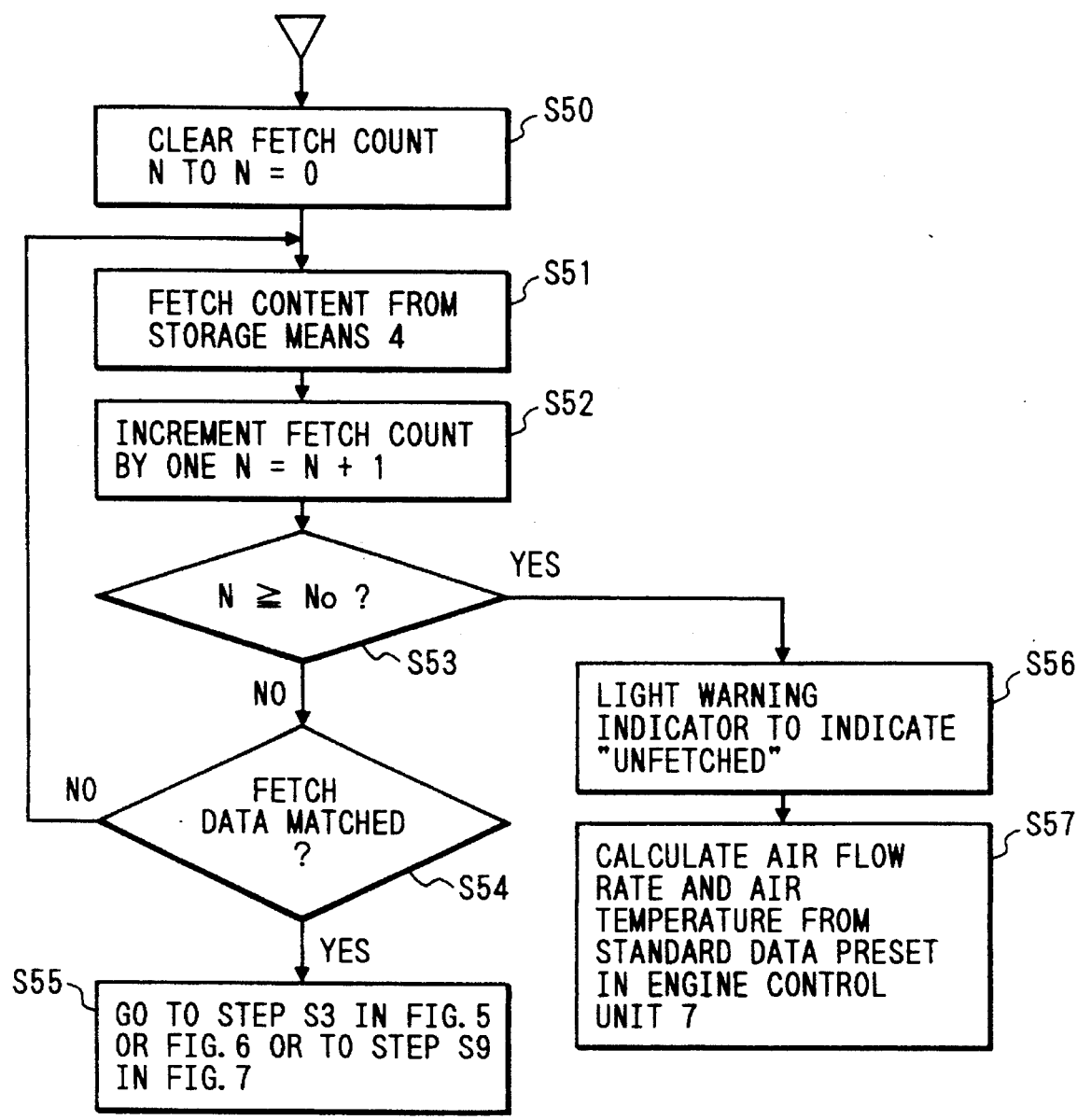
FIG. 15 shows a flow chart explaining one example of fetching data from a storage means 4 in the first and second embodiments.

This section explains a method of fetching the content of a storage means 4 provided on the air meter 11 and storing it correctly in the engine control unit 7 together with FIG. 15 is a detailed representation of step S2 in FIG. 5 and FIG. 6 and step S8 in FIG. 7.

The storage means 4 stores already-described data (1) to (5) such as air flow rate versus output characteristics data in two different addresses. In other words, the storage means 4 stores two sets of such data in it. In steps S50 to S53, two sets of such data are fetched from the storage means 4 and sent to the engine control unit 7. In step S54, the micro computer checks whether these sets of data are identical. When they are identical, the micro computer assumes that the data is fetched correctly without being interfered by noises and goes to the next step S55. When these sets of data are not identical, the micro computer fetches data by a preset number of times (two or three times). When the fetched set of data is equal to the other set of data, the micro computer goes to the next step S54. If the data is not identical, the micro computer assumes that the content of the storage means 4 is unfetchable and turns on the warning indicator 16 (in step S56). In the subsequent step S57, the micro computer calculates the air flow rate and the air temperature according to the standard characteristics data stored in advance in the engine control unit 7 without using the content of the storage means 4. The above checking procedure can be substituted by a checking procedure comprising by storing only one set of data in the storage means 4, fetching the data set twice and comparing them. This is provided to avoid misfetching of the content of the storage means 4.

Figure 16:
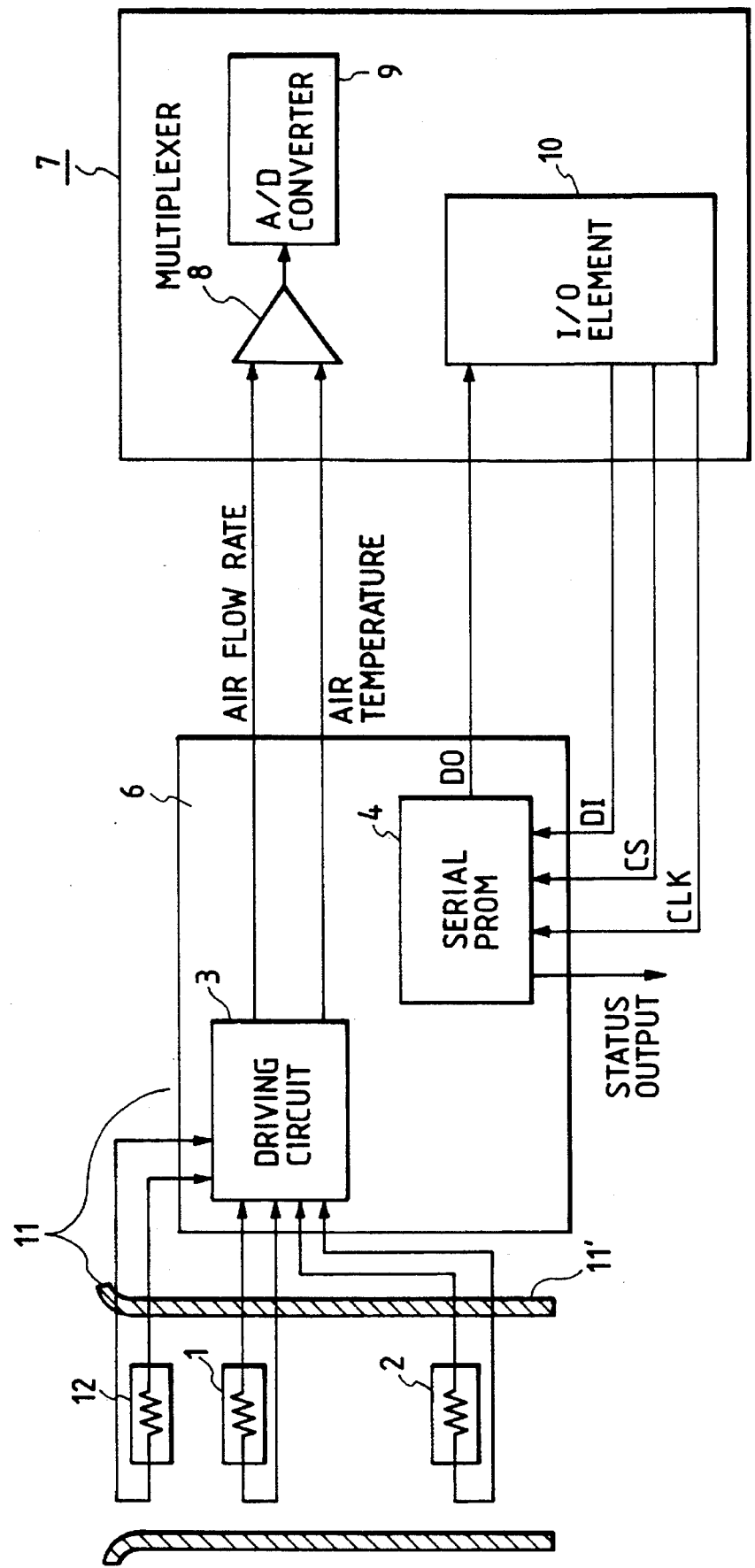
FIG. 16 shows a block diagram of the engine control system of a third embodiment of the present invention.

FIG. 16 is a block diagram illustrating the third embodiment of the present invention, which is a variation of the engine control system shown in FIG. 1. This embodiment does not use an analog switch 5.

In accordance with this embodiment, the driving circuit 3 and the serial EEPROM 4 provided in the electronic circuit 6 for measuring air flow rates which is mounted on the side wall of the air meter body 11 are separately connected to the engine control unit without sharing lines.

In this embodiment, Chip Select (CS), Clock (CLK), and Data Input (DI) signals are input to the EEPROM 4 from the I/O element 10 provided in the engine control unit 7. Data stored in said EEPROM 4 is transferred from the Data Output (DO) terminal to the I/O element 10 in the engine control unit 7. This embodiment has an effect of fetching the content of the EEPROM 4 correctly without being interfered by noises since the engine control system of this embodiment uses no analog switch 5 and has separate Data In (DI) and Data Out (DO) lines.

Figure 17:
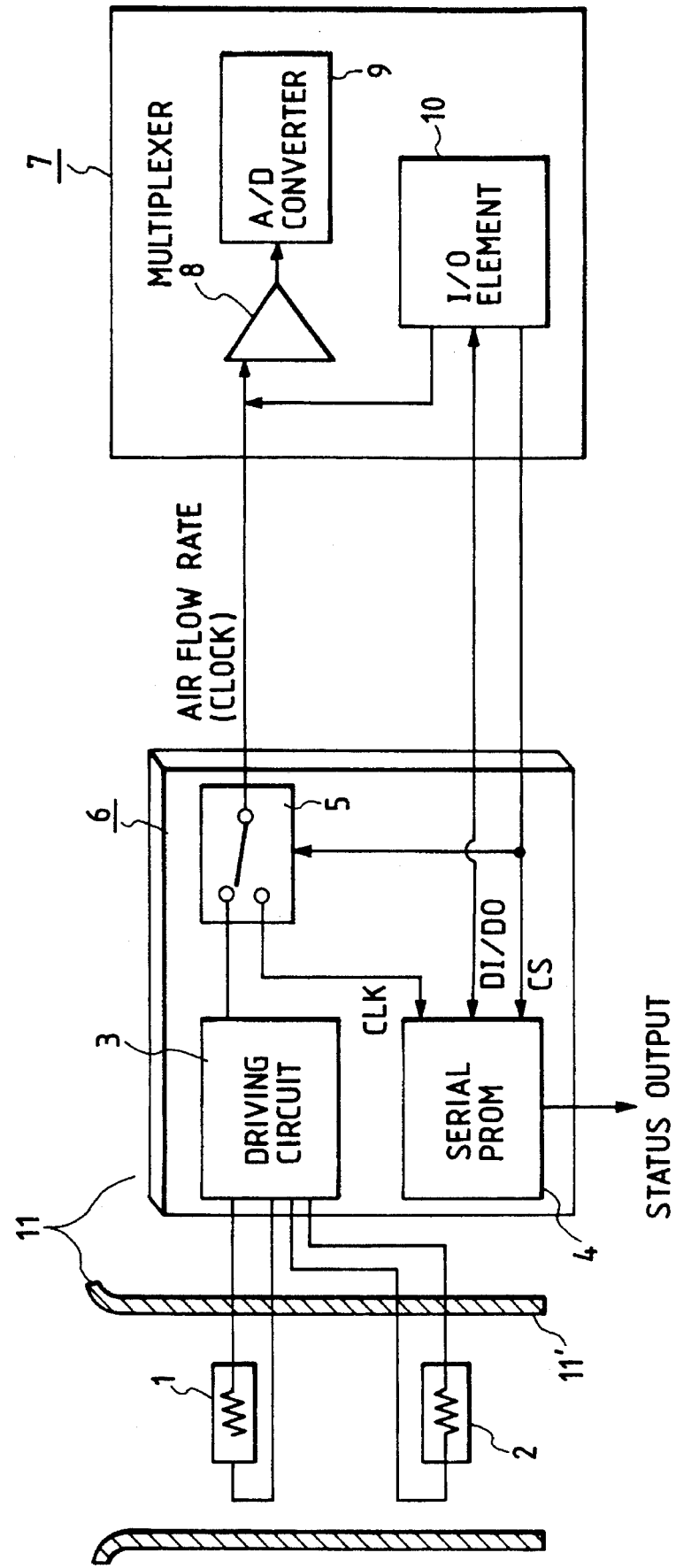
FIG. 17 shows a block diagram of the engine control system of a fourth embodiment of the present invention.

FIG. 17 is a block diagram illustrating a variation (a fourth embodiment) of the engine control system shown in FIG. 1. This embodiment has only the Flow Rate signal as the output signal. When the content of the EEPROM 4 provided in the air meter 11 is fetched, the Chip Select (CS) signal and the Data Input (DI) signal are transferred from the I/O element 10 in the engine control unit 7 to the serial EEPROM 4. The Chip Select (CS) line is also connected to the Control Input terminal of the analog switch 5. When the Chip Select signal becomes high, the analog switch 5 connects the I/O element 10 to the Clock Input terminal of the serial EEPROM 4 to input a clock signal to the Clock terminal (CLK) of the EEPROM 4. The data retained in the EEPROM 4 is transferred from the Data Output (DO) terminal of the serial EEPROM 4 to the I/O element 10 in the engine control unit 7. This embodiment has a merit of fetching the content of the EEPROM 4 correctly without being interfered by noises since the Data Output line does not pass through the analog switch 5.

Figure 18:
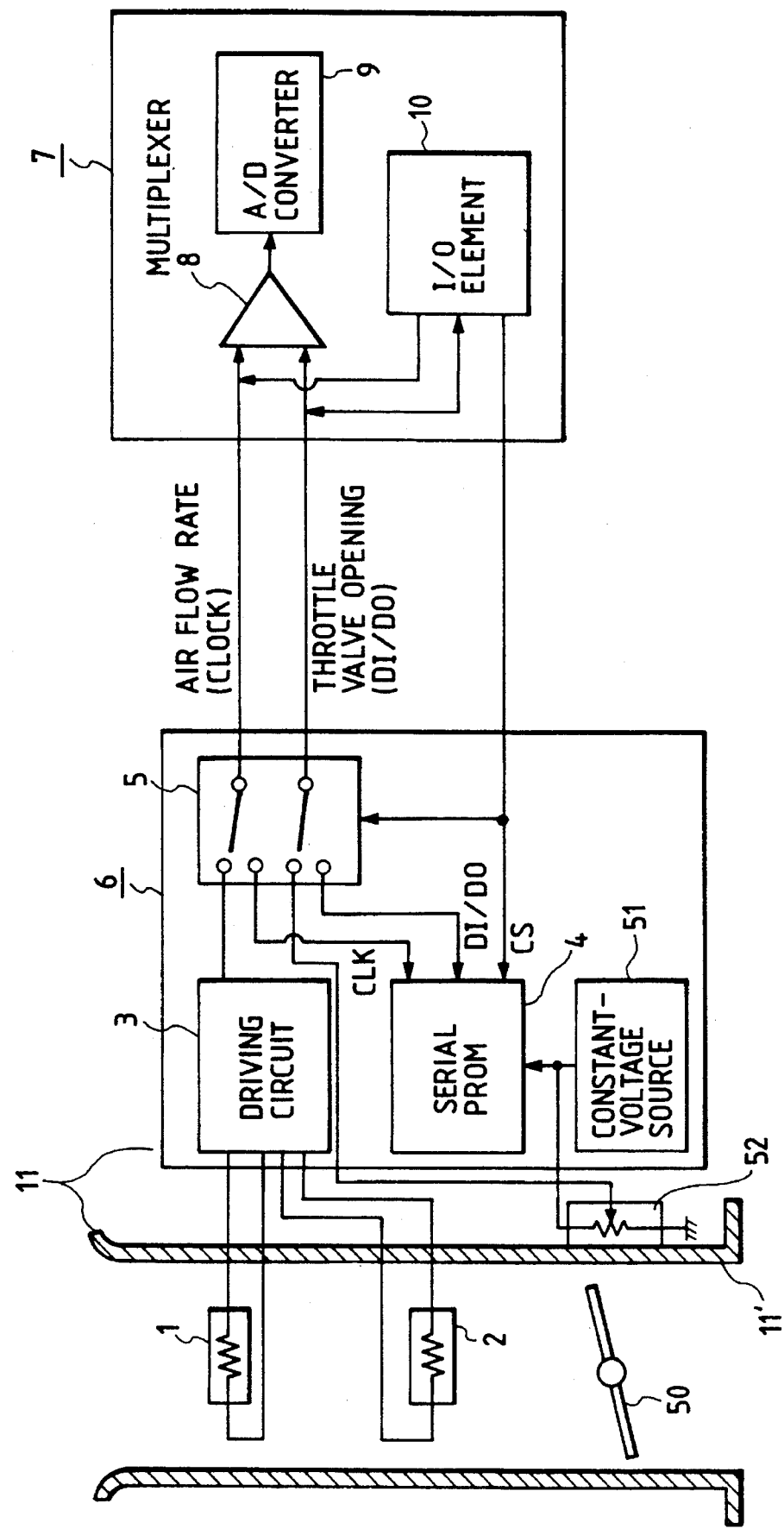
FIG. 18 shows a block diagram of the engine control system of a fifth embodiment of the present invention.

FIG. 18 is a block diagram illustrating another variation (a fifth embodiment) of the engine control system shown in FIG. 1. This embodiment uses the air meter body 11' also as a throttle body. The air meter body 11' has a throttle valve opening meter (throttle opening sensor) 52 on it besides the aforementioned air meter. The embodiment outputs the Flow Rate signal and the Throttle Valve Opening signal to the engine control unit 7 from the output terminals (connector) of the electronic circuit of the air meter.

The valve opening meter 52 of the throttle valve 50 consists of a variable resistor and connected to the constant-voltage source 51. The signal voltage of the valve opening meter 52 is input to the multiplexer 8 and to the A/D converter 9 via the analog switch 5. In this embodiment like the first embodiment, the analog switch 5 switches between the connection of the EEPROM 4 to the engine control unit 7 and the connection of the driving circuit 3 and the valve opening meter 52 of the air meter 11 to the engine control unit 7. Accordingly, this embodiment has an effect of reducing the number of lines connecting the electronic circuit 6 of the air meter and the engine control unit 7 and an effect of reducing the number of connector terminals since the air meter driving circuit 3 and the throttle valve opening meter 52 share an identical output terminal.

In accordance with this embodiment, the storage means 4 provided on the air meter 11 stores two sets of throttle opening data and output signal data $(K_1, V_1)$ and $(K_2, V_2)$ of the throttle valve opening meter itself which is the data pertaining to the throttle-opening versus output signal characteristics. In step S2 in FIGS. 5 and 6 or step S8 in FIG. 7, this data is fetched along with the air flow rate versus output characteristics data or correction data and sent to the engine control unit.

Figure 19:
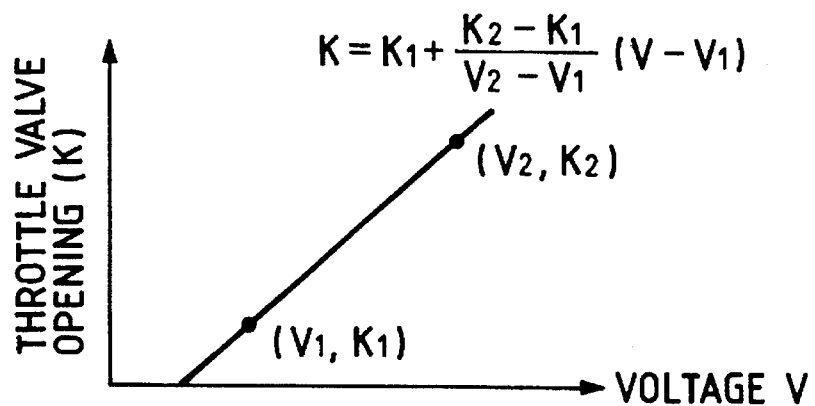
FIG. 19 shows a graph explaining valve opening versus output characteristics data of a throttle valve used in the fifth embodiment.
Figure 20:
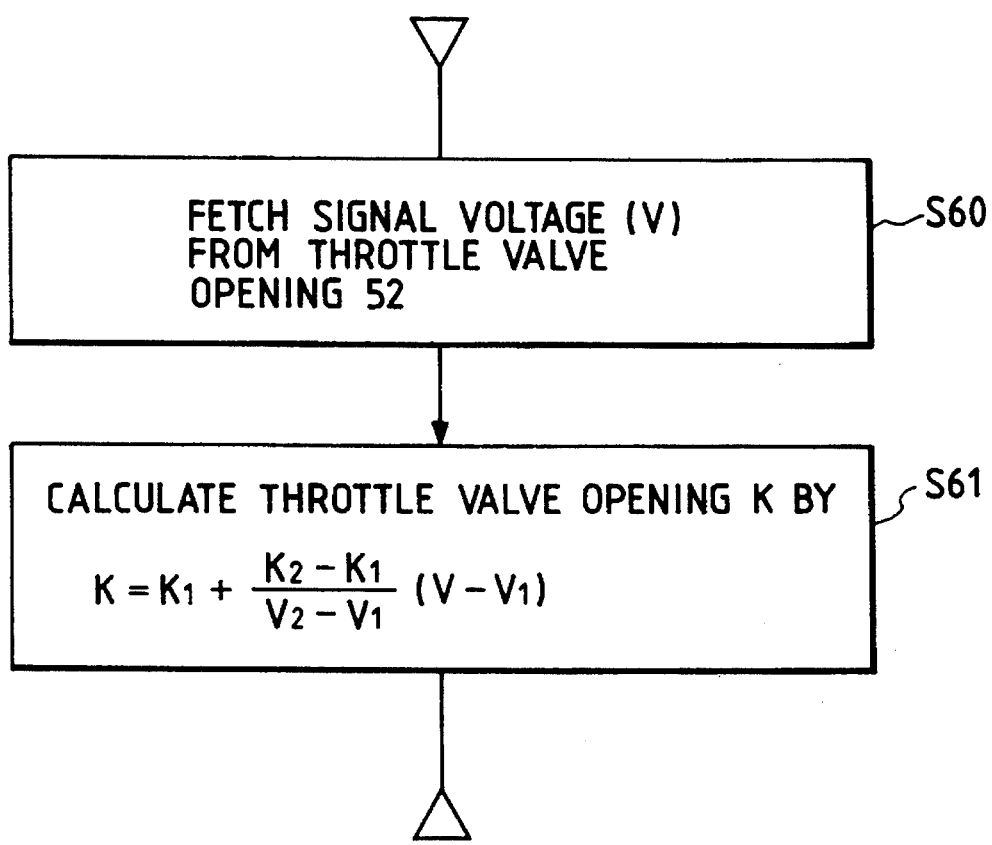
FIG. 20 shows a flow chart explaining a method of determining the opening of a throttle valve in the fifth embodiment.

FIG. 19 and FIG. 20 are graphic and schematic representations explaining a method of obtaining the opening of the throttle valve from a signal sent from the throttle valve opening meter 52. In step S60 in FIG. 20, a signal voltage V is fetched from the throttle valve opening meter 52 in actual operation. The relation between the valve opening K and the signal voltage V is expressed by a simple equation shown in FIG. 19. In step S61, the signal voltage is assigned to the equation representing the relation of said two sets of data and thereby the opening K of the throttle valve is determined. This method singly requires to store two sets of valve opening data K and signal voltage data V in the storage element 4 and does not require an adjustment work of narrowing the dispersion of resistance values of the throttle valve opening meter.

Figure 21:
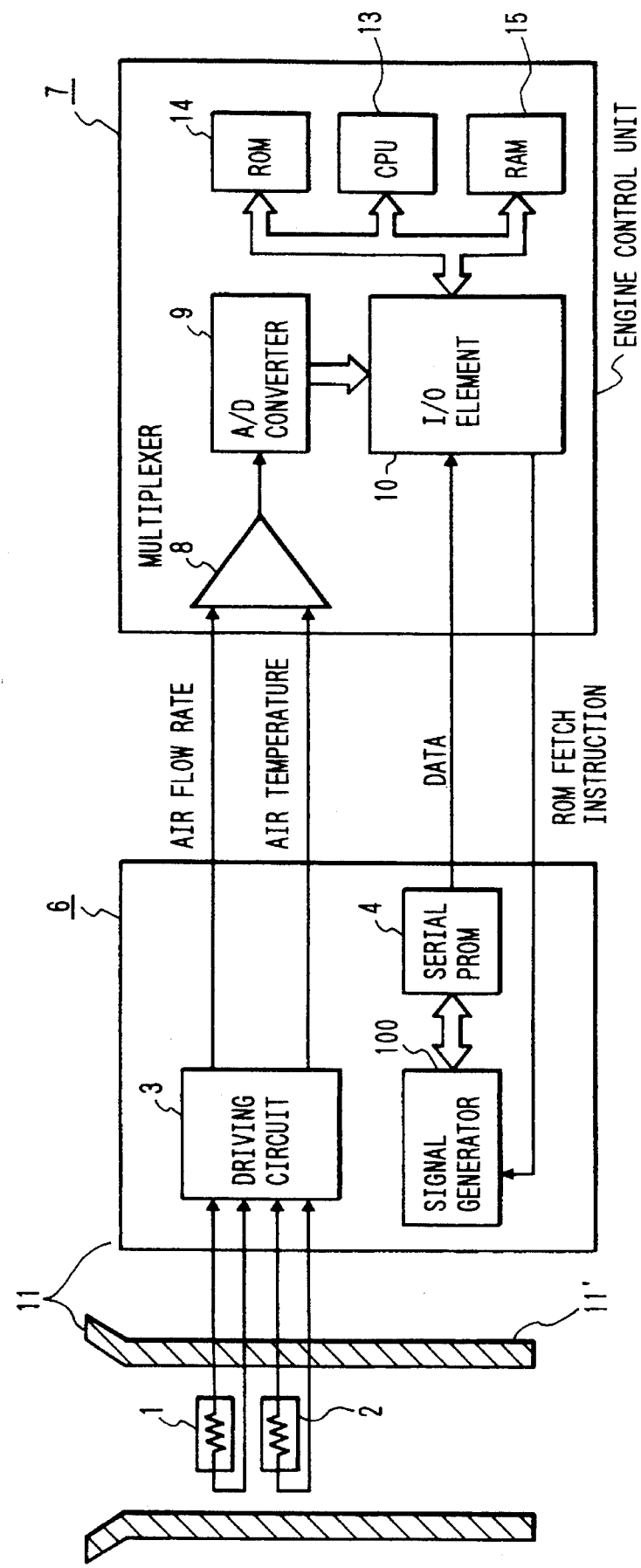
FIG. 21 shows a block diagram of the engine control system of a sixth embodiment of the present invention.

FIG. 21 is a block diagram illustrating a sixth embodiment of the present invention, which is a variation of the engine control system shown in FIG. 1. In accordance with this embodiment, the electronic circuit 6 has a signal generator 100 for automatically sending data from the storage element (serial PROM) 4 to the engine control unit 7 to reduce the number of signal lines between the engine control unit 7 and the serial PROM 4. This signal generator receives an instruction to fetch the content of the ROM 14 from the engine control unit 7, generates a memory address in synchronism with it, and sends it to the serial PROM 4.

Figure 22:
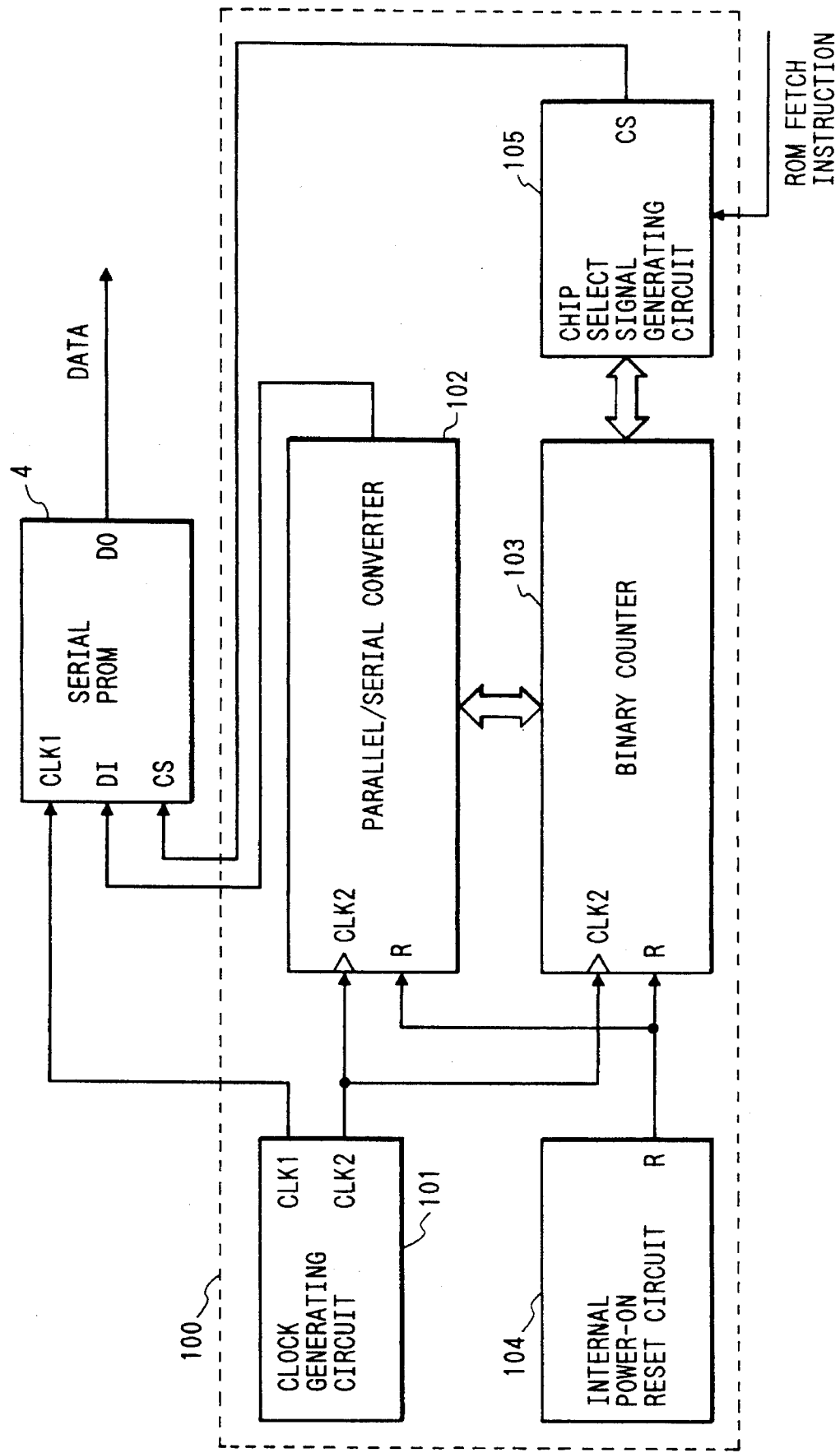
FIG. 22 shows a detailed block diagram of the signal generator used in the sixth embodiment.

FIG. 22 is a block diagram illustrating a detailed configuration of the signal generator 100. The signal generator 100 comprises a clock generating circuit 101 for generating reference clock signals, a binary counter 103 for dividing a clock signal into address signals, a parallel serial converter 102 for converting parallel address signals sent from the binary counter 103 to a serial address signal, a Chip Select signal generating circuit 105 for controlling the data transmission timing, and a Power-On Reset circuit 104 for resetting logics immediately when power is turned on. This signal generating circuit can be easily integrated into a package by conventional semiconductor technology such as CMOS.

Figure 23:
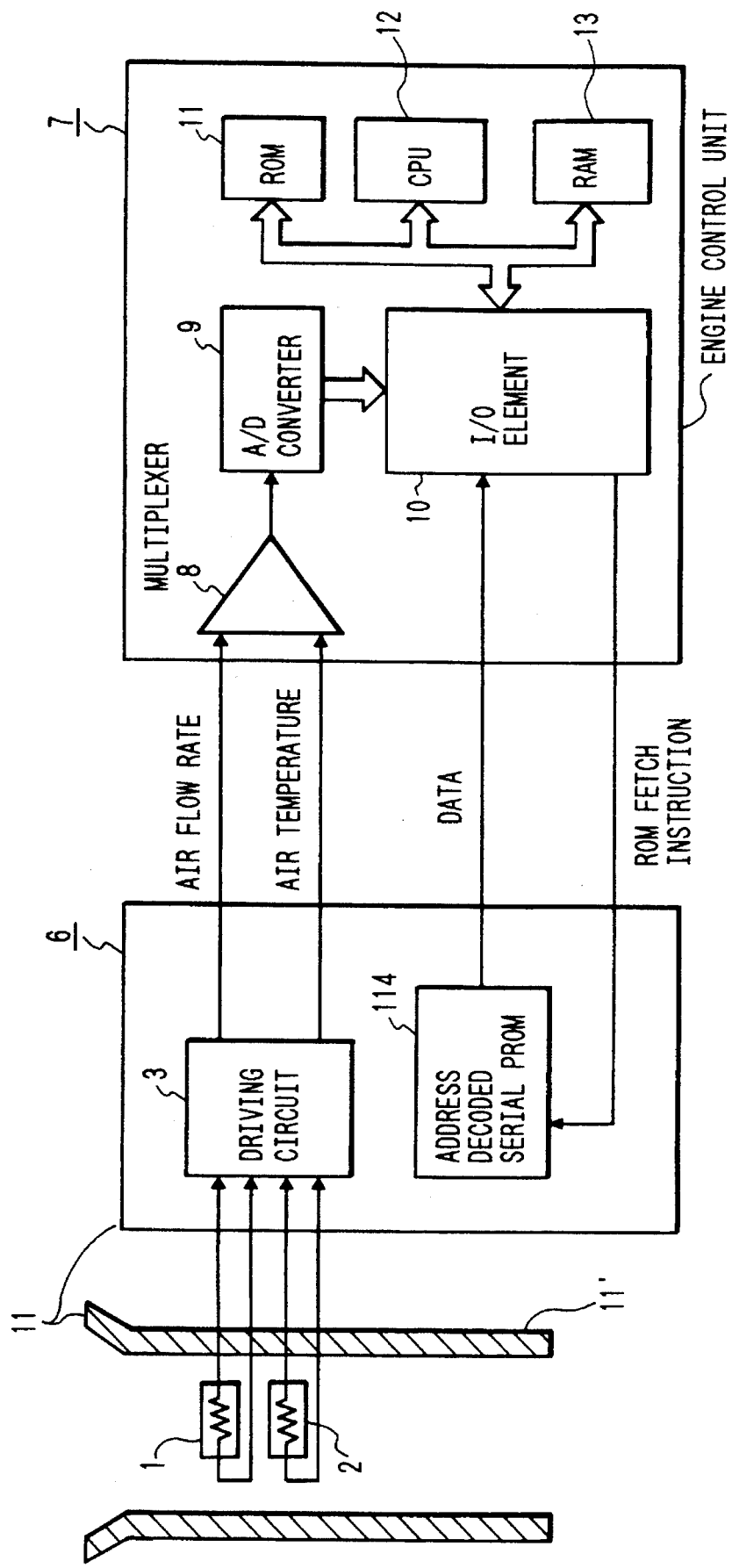
FIG. 23 shows a block diagram of the engine control system of a seventh embodiment of the present invention.
Figure 24:
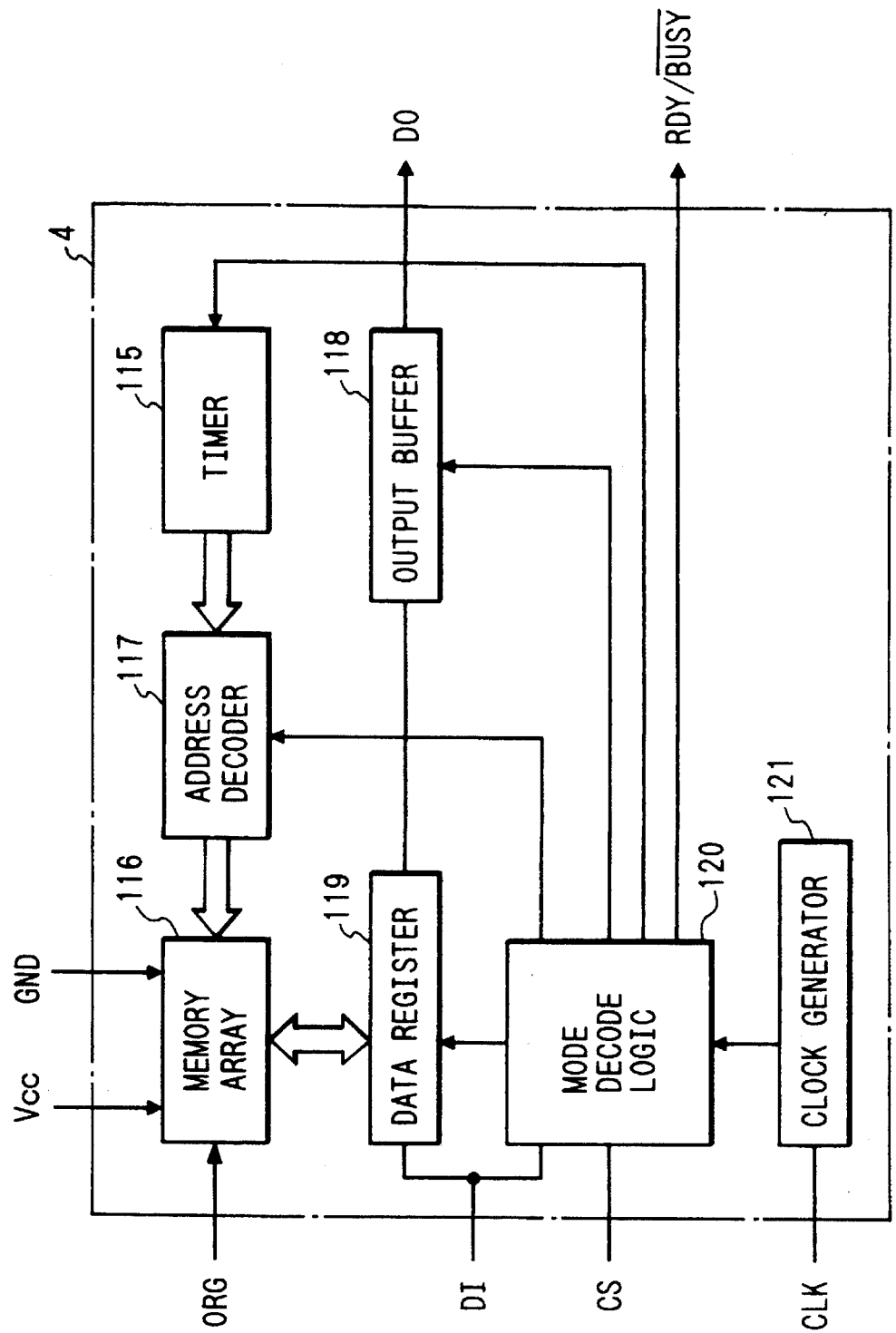
FIG. 24 shows a detailed block diagram of the serial PROM of the seventh embodiment.

FIG. 23 is a block diagram illustrating a seventh embodiment of the present invention. In accordance with this embodiment, a circuit of automatically updating a memory address is provided on the address decoder built in the serial PROM 4. These circuits are unified. FIG. 24 is a detailed block diagram of the automatic update circuit. The serial PROM 4 consists of a memory array 116, an address decoder 117, an output buffer 118, a data register 119, a mode decode logic 120, and a clock generator 121. The serial PROM 4 also contains a timer 115 which automatically counts and runs when an external signal such as Chip Select is input to the serial PROM 4. Consequentially, data can be fetched from the memory array 116 without input of an address signal from the outside. This effect is obtained just by adding a timer circuit to the serial PROM. Accordingly, this embodiment has an effect of simplifying the configuration of the signal generator 100.

Another preferred embodiment (an eighth embodiment) for obtaining the air flow rate and the configuration of the air meter electronic circuit illustrated in FIGS. 1 and 10 will be explained below together with the accompanying drawings FIGS. 25–28.

Figure 25:
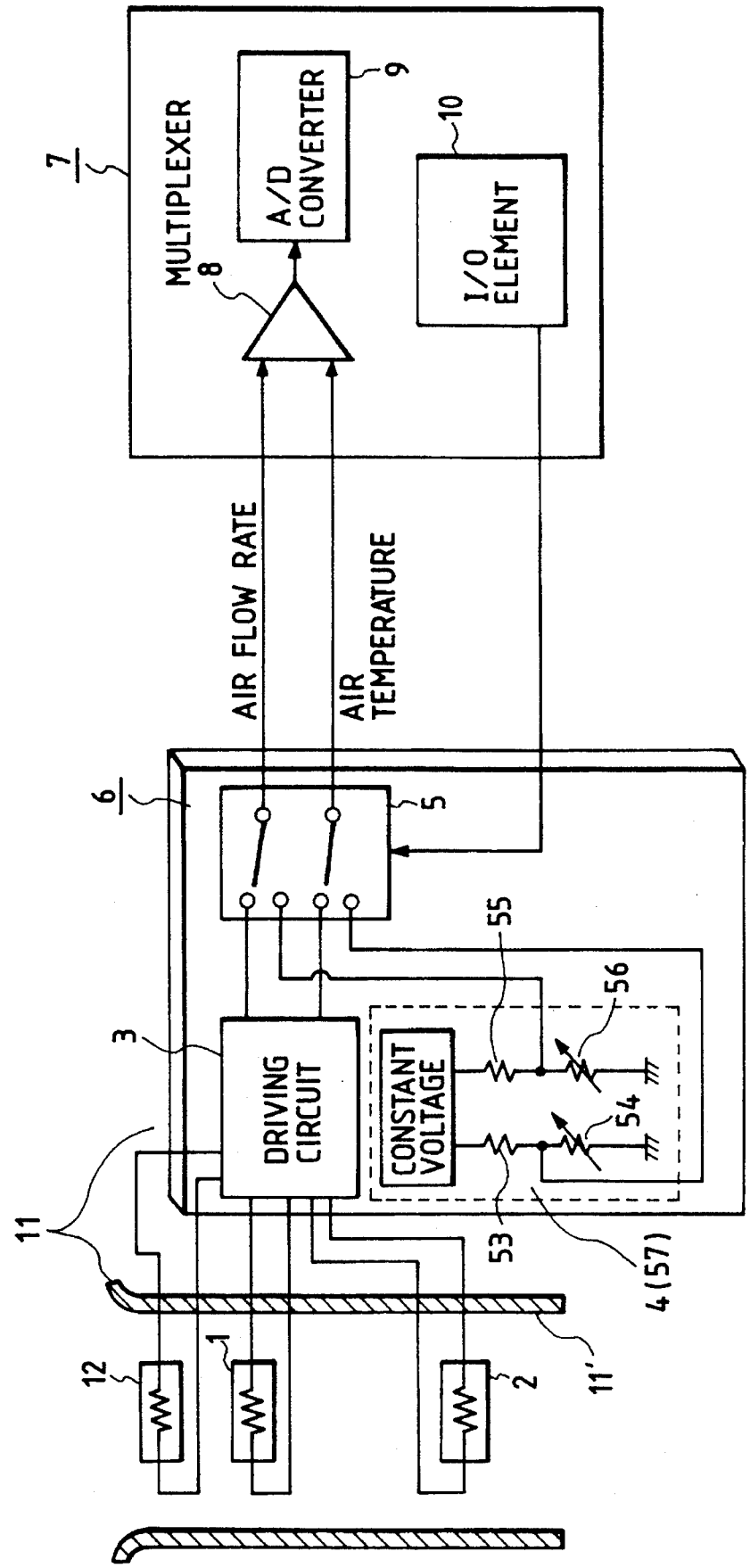
FIG. 25 shows a block diagram of the engine control system of an eighth embodiment of the present invention.

In accordance with the embodiment illustrated in FIG. 25, the electronic circuit 6 of the air meter comprises a driving circuit 3, a storage means 4, and an analog switch 5. The storage means 4 consists of a constant-voltage split resistor circuit 57 which retains voltage values obtained by dividing a constant voltage by resistor elements 53, 54, 55, and 56 as data. In accordance with this embodiment, two split voltage values are made potentially equal to signal voltages $V_1$ and $V_2$ at two different air flow rates $Q_1$ and $Q_2$ of the air meter itself. The ROM in the engine control unit 7 stores the standard air flow rate versus output characteristics data (standard characteristics data). Further, a span adjustment of the differential amplifier (represented by 17 in FIG. 4) in the driving circuit 3 is performed only at the output voltage $V_3$ corresponding to the standard air flow rate $Q_3$ and the result is stored in the ROM in the engine control unit 7.

Figure 26:
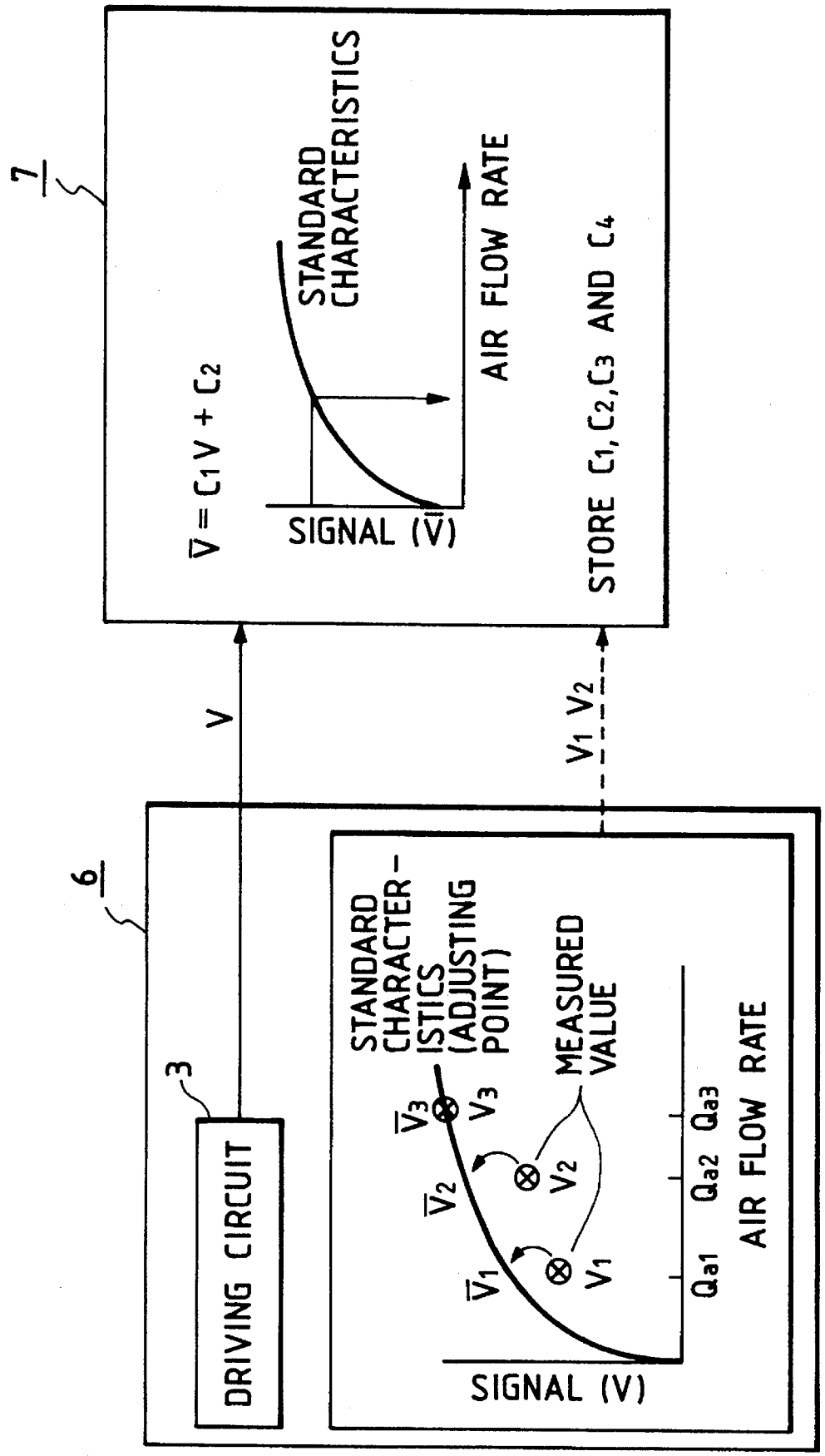
FIG. 26 shows a representation explaining a procedure of determining air flow rates from two potentials in the constant-voltage split resistor circuit 57 which is a kind of storage means by using correction coefficients Ci of signal characteristics in a system having an air meter and an engine control unit in the eighth embodiment.
Figure 27:
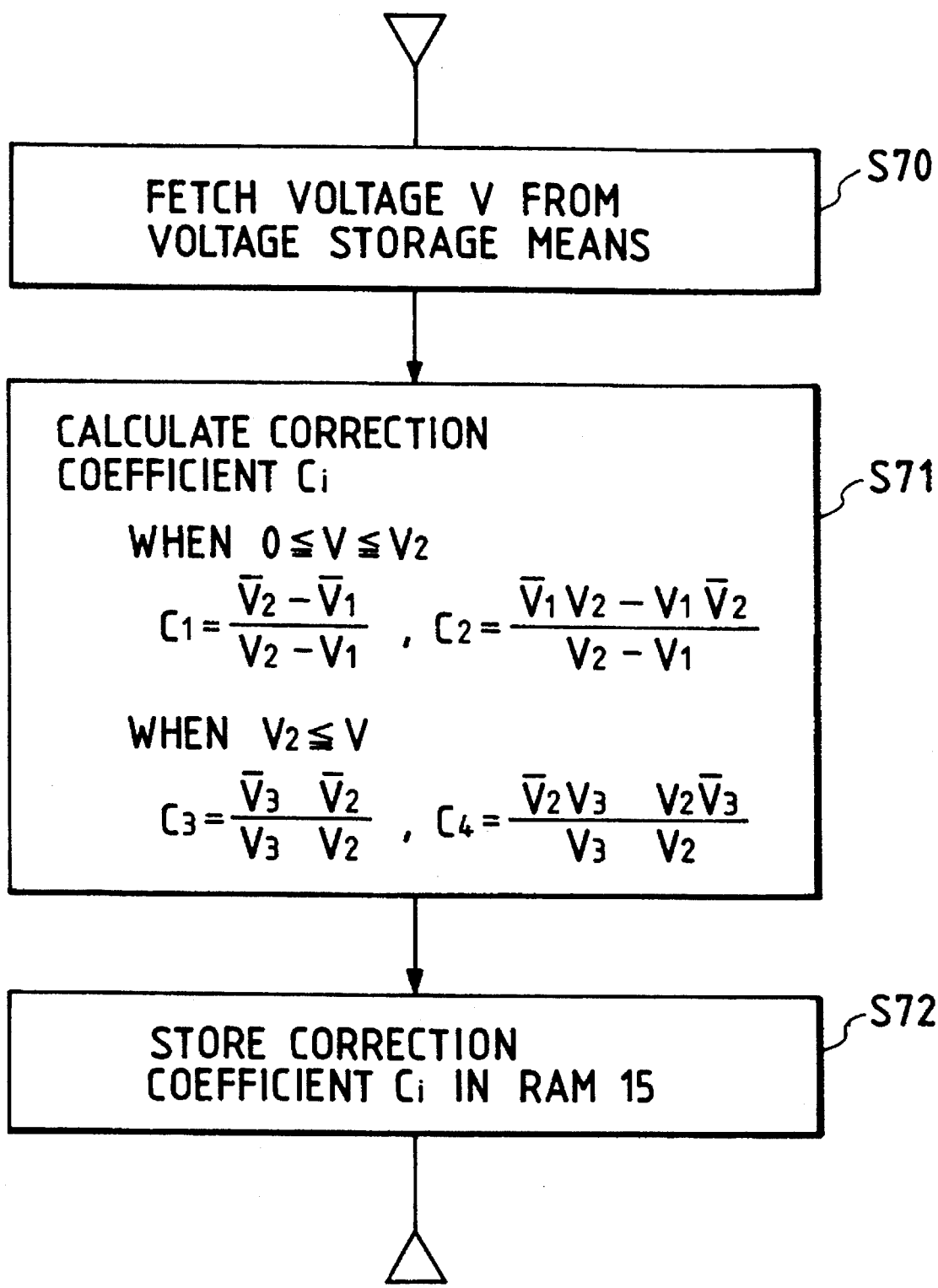
FIG. 27 shows a flow chart explaining a method of determining correction efficients for calculation of air flow rates in the eighth embodiment.

In accordance with this embodiment, in step S2 in FIGS. 5 and 6 and in step S8 in FIG. 7, the I/O element 10 in the engine control unit 7 outputs an analog switch control signal to connect the constant-voltage split resistor circuit 57 to the multiplexer 8 in the engine control unit 7, fetches two potentials $V_1$ and $V_2$ of the constant-voltage split resistor circuit 57 and sends then to the engine control unit 7 (which is equivalent to the content in step S70 in FIG. 27), calculates a correction coefficient Ci ($C_1$ for a gain value and C2 for a bias value) for matching the actual output of the air meter to the standard characteristics in the range of 0 V $V_2$ by using the above two potential values $V_1$ and $V_2$, standard characteristics data, an adjusting point $V_3$, and an equation in step S71 in FIGS. 26 and 27, further calculates a correction coefficient Ci ($C_3$ for a gain value and $C_4$ for a bias value) for matching the actual output of the air meter to the standard characteristics in the range of $V_2$ V, and stores these gain values, bias values, and measured values $V_1$ and $V_2$ in the RAM 15 (in step S72 in FIG. 27).

The section below explains a method of determining an air flow rate in this embodiment.

When the Air Flow Rate signal and the Air Temperature signal are transferred from the driving circuit 3 of the air meter to the engine control unit 7, the analog switch 5 is switched from the constant-voltage split resistor circuit 57 to the driving circuit 3.

Figure 28:
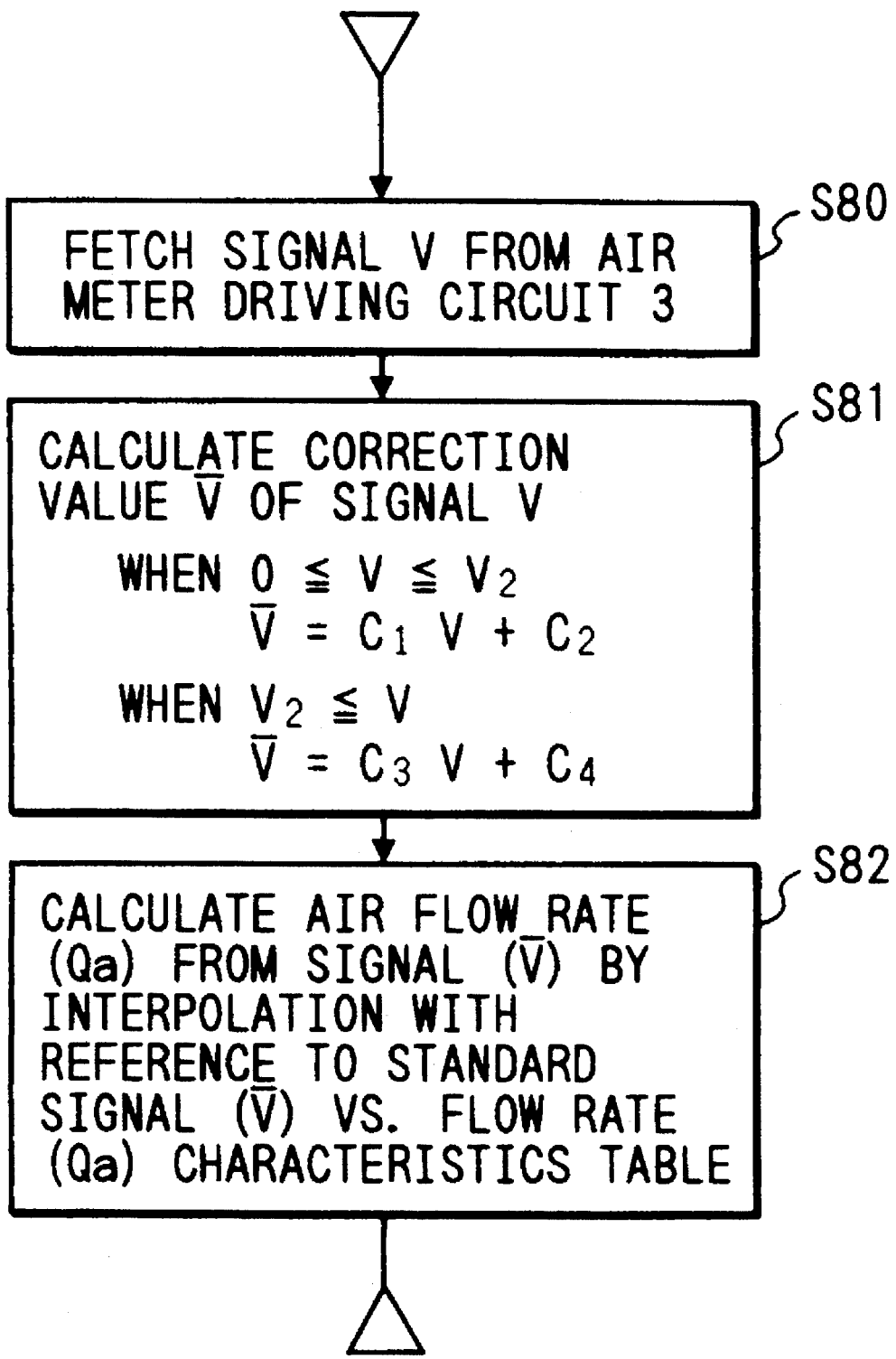
FIG. 28 shows a flow chart explaining a method of determining air flow rates in the eighth embodiment.

The engine control system fetches a signal V from the driving circuit S of the air meter in actual operation in step S80 in FIG. 28; selects adequate gain values $C_1$ and $C_3$ and bias values $C_2$ and $C_4$ according to the value of the signal V and calculates the correction value of the signal V in step S81; and calculates the air flow rate by interpolation from the corrected signal value with reference to the standard characteristics table pre-stored in the engine control unit 7 in step 82.

Figure 11:
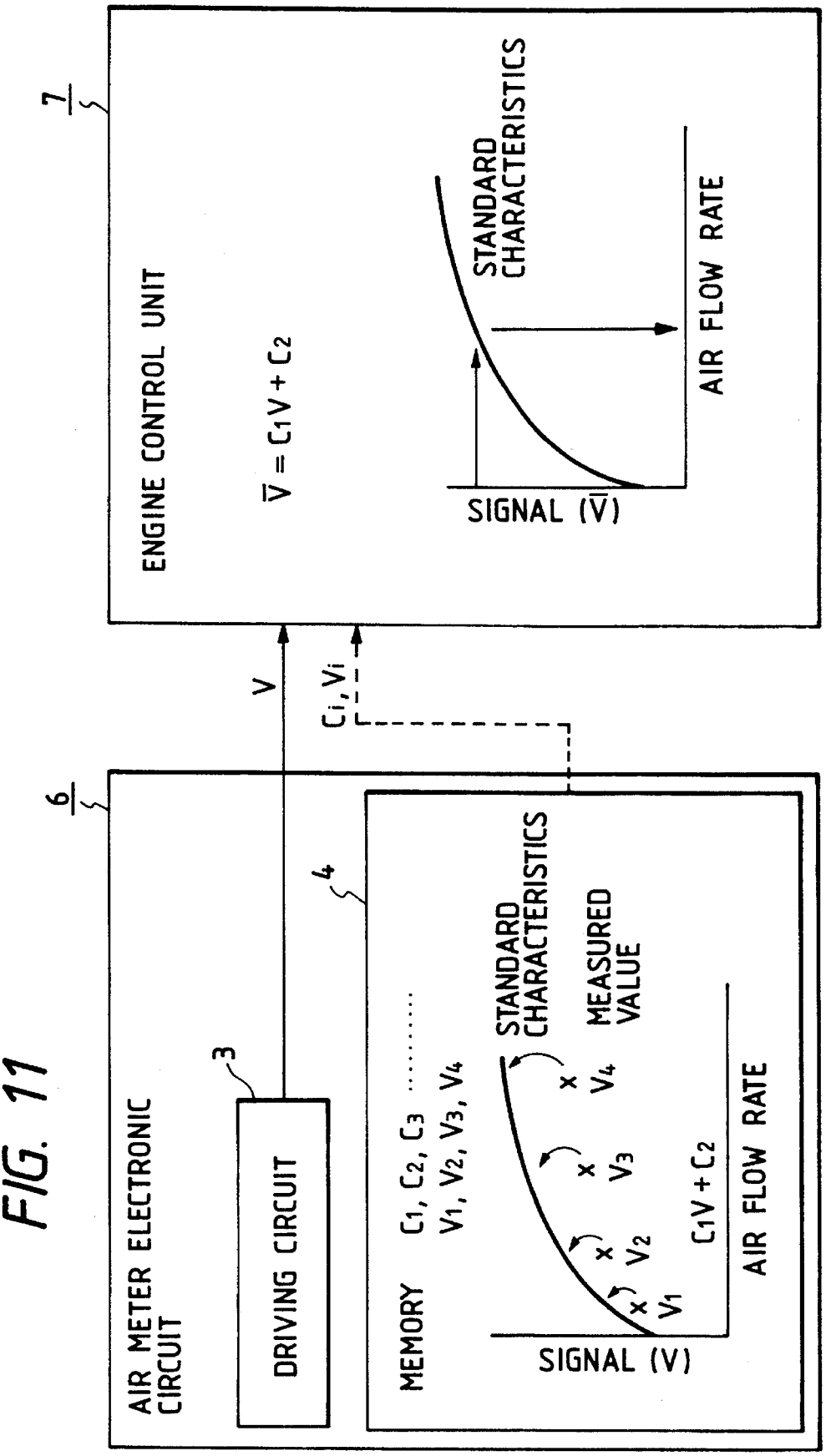
FIG. 11 shows a block diagram representing an air meter and an engine control unit in the second embodiment.

Since this embodiment as well as the case in FIG. 8 and FIG. 11 uses the air flow rate versus output characteristics of the air meter which is actually measured, air flow rates can be calculated at high accuracy in a wide range. Further, a span adjustment of the differential amplifier is performed at only one point $V_3$ and correction constants are calculated by combining correction data $V_1$ and $V_2$ which are stored in the storage means 4. Therefore, this embodiment does not require any conventional repetitive adjustment on two points as in the case of using a differential amplifier, which reduces adjustment time. Furthermore, this embodiment employs a constant-voltage split resistor circuit as the storage means 4 which is cheaper than the storage means in FIG. 8 and FIG. 11 and has high reliability.

Although this embodiment uses measured signal values at two flow rates, three or more flow rates can be used. The more flow rates are used, the more accurate the flow rate measurement becomes.

Furthermore, the air flow rate versus output characteristics data and correction data for calculation of air flow rates to be written in the storage means 4 of the air meter in the above embodiments can be created and stored in the storage means by the air meter manufacturers before the storage means are mounted on engines or by the automobile manufacturers after the storage means are mounted on engines. In the latter case, the CPU in the engine control unit 7 can have a function of creating correction constants as shown in FIG. 10.

For example, it is accomplished by connecting an air meter 11 having a storage means 4 to an engine control unit 7, mounting this engine control system on a car, applying air of two or more known flow rates to the air meter in advance in the manufacturing line, detecting its air-to-fuel ratio by an air-to-fuel ratio sensor, and causing the CPU in the electronic circuit 7 to calculate correction constants (e.g. gain values and bias values) to match the output of each air meter to the standard characteristics assuming that the output of the air meter is away from the standard characteristics if the air-to-fuel ratio is away from the expected air-to-fuel ratio corresponding to the air flow.

In this case, the obtained correction constants are highly reliable as the air-to-fuel sensors generally have high precision. Further, the latter case can make the output characteristics of the air meter match with the standard characteristics even when the intake passage or air cleaner is partially modified by the manufacturer and the output characteristics of the air meter are affected by it, In accordance with the problem solving means 1-1 and 1-2, the accuracy in measurement of air flow meters can be increased in a wide range without conventional repetitive adjustment of a differential amplifier to match the outputs of the air meter to the standard characteristics since the air flow rate versus output characteristics data of the air meter itself which was obtained by actual measurement is used for calculation of air flow rates. Consequently, the present invention can provide a high-accuracy engine control system having high fuel ratio and making its exhaust gas less toxic.

Further, provision of air flow rate versus output characteristics data from the side of the air meter enables simple connection of air meters to engine control units of the same type without matching. This makes the engine control system highly air-meter-compatible.

In accordance with the problem solving means 1-3 and 1-4, air flow rate calculations are carried out after output signals of the air meter are automatically matched with the standard characteristics even when the air flow rate versus output characteristics data is used for calculation of air flow rates. Accordingly, these problem solving means as well as the problem solving means 1-1 and 1-2 can calculate air flow rates at high accuracy in a wide range and thus make the engine control system highly air-meter-compatible.

In accordance with the second problem solving means, the air flow rate versus output characteristics data or flow rate correction data to attain the above effects can be created and stored by any of the air meter manufacturers and automobile parts manufacturers.

In accordance with the third problem solving means, an effect of preventing improper air meters from being mounted on engine control units is obtained in addition to the above effects. In accordance with the fourth problem solving means, it is possible to prevent the relation between outputs and physical quantities of sensors such as an air thermometer and a throttle opening meter from being dispersed.

What is claimed is:

1. An air meter having an electronic circuit for measuring the rate of air taken into an engine and a storage means on the body of the air meter forming part of an intake passage of the engine wherein said storage means stores correction data for calculation of air flow rate.

2. An air meter having an electronic circuit for measuring the rate of air taken into an engine and a storage means on the body of the air meter forming part of an intake passage of the engine wherein said storage means stores air flow rate versus output characteristics data for calculation of air flow rate obtained by supplying a preset rate of air into said air meter body.

3. An air meter as claimed in claim 2, wherein said storage means is built on a printed circuit board for said air meter measuring electronic circuit.

4. An air meter having an electronic circuit for measuring the rate of air taken into an engine and a storage means on the body of the air meter forming part of an intake passage of the engine wherein said storage means is designed so that it may be connected to the engine control unit excluding the air meter body.

5. An air meter as claimed in claim 4, wherein said storage means is built on a printed circuit board for said air meter measuring electronic circuit.

6. An engine control equipment for an engine comprising:
an air meter for measuring the rate of air taken into the engine; and
an engine control unit for calculating the rate of fuel to be supplied according to this air flow rate;
wherein a storage means is provided on a side of said air meter separately from said engine control unit and said storage means stores correction data for calculation of air flow rate.

7. An engine control equipment as claimed in claim 6 wherein said correction data is a correction constants to match the air flow rate versus output characteristics of the air meter to the standard characteristics or data to be assigned to an operation expression which obtains said correction constant.

8. An engine control equipment as claimed in claim 7 wherein said engine control unit is equipped with an arithmetic means which determines the rate of intake air by fetching air flow rate versus output characteristics data or correction data from said storage means provided on the side of said air meter and calculating the signal output from said air meter with reference to this fetched data.

9. An engine control equipment for an engine comprising:
an air meter for measuring the rate of air taken into the engine; and
an engine control unit for calculating the rate of fuel to be supplied according to this air flow rate;
wherein a storage means is provided on a side of said air meter separately from said engine control unit and said storage means stores data pertaining to air flow rate versus output characteristics of the air meter itself.

10. An engine control equipment as claimed in claim 9, wherein said storage means stores data to identify air meter types and said engine control unit is provided with a means for identifying whether or not the rate of intake air is adequate according to this type identifying data.

11. An engine control equipment as claimed in claim 10, wherein said storage means is a serial I/O PROM.

12. An engine control equipment as claimed in claim 9, wherein said storage means is a serial I/O PROM.

13. An engine control equipment as claimed in claim 12, wherein said storage means consists of a constant voltage split resistor circuit for storing voltage values splitting a constant voltage by resistors as data.

14. An engine control equipment as claimed in claim 9 wherein said engine control unit is equipped with an arithmetic means which determines the rate of intake air by fetching air flow rate versus output characteristics data or correction data from said storage means provided on the side of said air meter and calculating the signal output from said air meter with reference to this fetched data.

15. An engine control equipment as claimed in claim 14, wherein the output terminal of an air flow measuring electronic circuit provided on said air meter and the output terminal of said storage means are connected to said engine control unit via a switch so that they may be switched by an instruction from said engine control unit.

16. An engine control equipment as claimed in claim 15, wherein said engine control unit is designed to fetch air flow rate versus output characteristics data or correction data from said storage means provided on said air meter and write it in RAM provided on said engine control unit when the key switch of the engine is turned on or off.

17. An engine control equipment as claimed in claim 14, wherein said engine control unit is designed to fetch air flow rate versus output characteristics data or correction data from said storage means provided on said air meter and write it in RAM provided on said engine control unit when the key switch of the engine is turned on or off.

18. An engine control equipment as claimed in claim 17, wherein said storage means stores data to identify air meter types and said engine control unit is provided with a means for identifying whether or not the rate of intake air is adequate according to this type identifying data.

19. An engine control equipment as claimed in claim 9, wherein said storage means consists of a constant voltage split resistor circuit for storing voltage values splitting a constant voltage by resistors as data.

20. An engine control equipment as claimed in claim 19, wherein said air meter has a sensor to sense a state required to control the engine other than air flow rate and said storage means stores data pertaining to the output characteristics of the sensor.

21. An engine control equipment as claimed in either claim 9 or claim 19, wherein said air meter has a sensor to sense a state required to control the engine other than the air flow rate and said storage means stores data pertaining to the output characteristics of the sensor.

22. An engine control equipment as claimed in claim 21, wherein said sensor for detecting the state required to control the engine other than the air flow rate is at least one of an air thermometer and a throttle opening sensor and the sensor output characteristics stored in the storage means on said air meter is data pertaining to temperature versus output characteristics when said sensor is an air thermometer or data pertaining to throttle opening versus output characteristics when said sensor is a throttle opening sensor.

* * * * *